US012634888B2

(12) United States Patent
Worrall et al.

(10) Patent No.: US 12,634,888 B2
(45) Date of Patent: May 19, 2026

(54) FACILITATING SMALL DATA TRANSMISSION (SDT) IN A MOBILE TELECOMMUNICATIONS NETWORK

(71) Applicant: Vodafone Group Services Limited, Newbury (GB)

(72) Inventors: Chandrika Worrall, London (GB); Alexey Kulakov, London (GB)

(73) Assignee: Vodafone Group Services Limited, Newbury (GB)

( * ) Notice: Subject to any disclaimer, the term of this patent is extended or adjusted under 35 U.S.C. 154(b) by 358 days.

(21) Appl. No.: 18/362,829

(22) Filed: Jul. 31, 2023

(65) Prior Publication Data

US 2024/0049178 A1    Feb. 8, 2024

(30) Foreign Application Priority Data

Aug. 4, 2022    (EP) ..................................... 22188802

(51) Int. Cl.
| | |
|---|---|
| *H04W 68/02* | (2009.01) |
| *H04L 5/00* | (2006.01) |
| *H04W 28/06* | (2009.01) |

(52) U.S. Cl.
CPC ........... *H04W 68/02* (2013.01); *H04L 5/0044* (2013.01); *H04W 28/06* (2013.01)

(58) Field of Classification Search
CPC ........................... H04W 68/02; H04W 52/0229
See application file for complete search history.

(56) References Cited

U.S. PATENT DOCUMENTS

| | | | |
|---|---|---|---|
| 2018/0139671 A1 | 5/2018 | Velev | |
| 2023/0379880 A1* | 11/2023 | Park | ...................... H04W 68/02 |

FOREIGN PATENT DOCUMENTS

| | | |
|---|---|---|
| WO | 2022/066888 | 3/2022 |
| WO | 2022/087275 | 4/2022 |

OTHER PUBLICATIONS

EP Search Report for application No. 22188802.7 dated Jan. 4, 2023.
Intel Corporation: "Details on MT EDT for CP solution (Msg2-based)", 3GPP Draft; R2-1906435 MT CP-EDT, 3rd Generation Partnership Project (3GPP), Mobile Competence Centre ; 650, Route Des Lucioles ; F-06921 Sophia-Antipolis Cedex ; France, vol. RAN WG2, No. Reno, USA; May 13, 2019-May 17, 2019 May 13, 2019 (May 13, 2019), XP051729900, Retrieved from the Internet: URL:http://www.3gpp.org/ftp/Meetings%5F3GPP%5FSYNC/RAN2/Docs/ R2%2D1906435%2Ezip [retrieved on May 13, 2019].

* cited by examiner

*Primary Examiner* — Curtis B Odom
(74) *Attorney, Agent, or Firm* — Workman Nydegger

(57) ABSTRACT

The present invention relates to methods, systems and apparatus for facilitating Small Data Transmissions (SDT) in a mobile telecommunications network. In particular, the present disclosure relates to a method comprising receiving, at a base station of the mobile telecommunications network, a portion of data to be transmitted to a terminal connected to the mobile telecommunications network; determining a transmission size indicator for the portion of data; and providing an enhanced paging message to the terminal, the enhanced paging message including the transmission size indicator, wherein the enhanced paging message is configured to allow the terminal to determine a required terminal connection state, for receiving the portion of data, based on the transmission size indicator.

12 Claims, 9 Drawing Sheets

400

410 — receiving, at a base station of a mobile telecommunications network, an portion of data to be transmitted to a terminal connected to the mobile telecommunications network 420 — determining a transmission size indicator for the portion of data 430 — providing an enhanced paging message to the terminal, the enhanced paging message including the transmission size indicator, wherein the enhanced paging message is configured to allow the terminal to determine a required terminal connection state, for receiving the portion of data, based on transmission size indicator.

FIGURE 4

FACILITATING SMALL DATA TRANSMISSION (SDT) IN A MOBILE TELECOMMUNICATIONS NETWORK

CROSS-REFERENCE TO RELATED APPLICATIONS

This application claims priority from EP Patent Application No: 22188802.7, filed Aug. 4, 2022, which is expressly incorporated by reference herein in its entirety.

FIELD OF THE INVENTION

The present invention relates to methods, systems and apparatus for facilitating Small Data Transmissions (SDT) in a mobile telecommunications network. In particular, the present disclosure relates to providing an enhanced paging message including a transmission size indicator to a terminal of a mobile telecommunications network, wherein the enhanced paging message is configured to allow the terminal to determine a required terminal connection state, for receiving a portion of data from a base station, based on the transmission size indicator.

BACKGROUND OF THE INVENTION

The ever increasing quantity of IoT (Internet of Things) technologies using machine-type communications provides a number of challenges for a Mobile Network Operator (MNO).

IoT traffic is often infrequent and small size data. This traffic may be from Instant Messaging services for smartphones (such as whatsapp, QQ, wechat, etc.), Heart-beat/keep-alive traffic from IM/email clients and other apps, push notifications from various smartphone applications, traffic from wearables (periodic positioning information etc.) sensors (Industrial Wireless Sensor Networks transmitting temperature, pressure readings periodically or in an event triggered manner etc.) smart meters and smart meter networks sending periodic meter readings.

Signals for transitioning a UE, such as an IoT device, to a radio resource control (RRC) connected state and maintaining the RRC connected state may cause a larger number of overheads (e.g., power consumption and delay) to a UE having small amount of data to transmit when in an RRC idle state or an RRC inactive state. For example, any time an IoT device wishes to send a small data payload across the network.

The $3^{rd}$ Generation Partnership Project uses Small Data Transmission (SDT) procedures to try and solve some of the problems associated with infrequent and small size data transmissions from a UE, such as an IoT device. Currently in Small Data Transmission (SDT) procedures, a UE is able to use Small Data Transmission (SDT) to provide a small payload of data to a base station, e.g. a small data payload can be provided in the Uplink (UL) direction. This may allow the UE to transmit a small data payload without transitioning to the RRC connected state.

However, current small data transmission (SDT) only allows for a UE to remain in the RRC inactive state whilst transmitting data from the UE to the base station, i.e. in the uplink (UL) direction.

There is, therefore, a need to extend current small data transmission (SDT) to encompass Downlink data.

SUMMARY OF THE INVENTION

Various aspects and embodiments of the invention are set out in the appended claims.

According to an aspect of the invention, there is provided an improved system and method in which data is communicated with a terminal such as user equipment (UE). One or more data radio bearers may have been established between the UE and a base station (also known as a gNB). After active transmission between the UE and the gNB has ceased the UE may transition to an inactive state (also known as RRC_INACTIVE). Usually, when the gNB wants to alert the UE that there is an incoming transmission the gNB will send a paging message to the UE. The paging messages sent from the gNB to the UE will evoke the same response from the UE irrespective of the size of the incoming transmission, with all transmissions being treated in the same way. Currently the UE must always move or transition to the connected state (also known as RRC_CONNECTED). However, the system can be improved in terms of efficiency of system resources being used more optimally, when different sized of incoming data transmissions for the UE are treated differently. If the UE was informed of the size of the incoming transmission, when variable or different sized of data payloads are sent to the UE in the downlink direction, then different transmissions protocols may be used. In particular, the UE may be able to remain in the inactive state and the downlink of data may take place via small data transmission (SDT). In an example implementation, the paging message sent to the UE by the gNB is improved or enhanced to contain an indicator of the size of the incoming transmission for the UE such that the UE may use the appropriate or required transmission mechanisms and protocols accordingly.

There is described herein a method of facilitating data transmissions in a mobile telecommunications network. The method comprises receiving, at a base station of the mobile telecommunications network, a portion of data to be transmitted to a terminal connected to the mobile telecommunications network. The method further comprises determining a transmission size indicator for the portion of data. The method further comprises providing an enhanced paging message to the terminal, the enhanced paging message including the transmission size indicator, wherein the enhanced paging message is configured to allow the terminal to determine a required terminal connection state, for receiving the portion of data, based on the transmission size indicator.

Optionally, the transmission size indicator is either a small data payload indicator or a normal data payload indicator.

Optionally, determining the transmission size indicator for the portion of data comprises determining if the portion of data to be transmitted to the terminal is a small data payload. Preferably, determining if the portion of data to be transmitted to the terminal is a small data payload comprises: determining if the portion of data was received by the base station within a threshold time. More preferably, if portion of data was received by the node within a threshold time then the portion of data to be transmitted to the terminal is a small data payload; or if the portion of data was not received by the node within a threshold time then the portion of data to be transmitted to the terminal is a normal data payload.

Optionally, the portion of data comprises a plurality of data packets and a final data packet of the plurality of data packets comprises an end marker.

Optionally, determining if the portion of data was received by the base station within a threshold time comprises: determining whether the end marker was received before a cut-off time.

Optionally, the method further comprises receiving, at the base station, size information for the portion of data.

Optionally, determining if the portion of data is a small data payload comprises comparing received size information for the portion of data to a threshold data transmission size.

Optionally, (i) if the portion of data received by the base station is less than or equal to a threshold data transmission size then the portion of data to be transmitted to the terminal is a small data payload; or (ii) if the portion of data received by the base station exceeds a threshold data transmission size then the portion of data to be transmitted to the terminal is a normal data payload.

Optionally, a first data packet, or a first set of data packets, of the portion of data comprises the size information for the portion of data.

Optionally, the size information for the portion of data is provided in a header of the first data packet or headers of the first set of data packets.

Optionally, the method further comprises transmitting the portion of data to the terminal.

Optionally, (i) if the portion of data is a small data payload then the portion of data then the method further comprises transmitting the portion of data to the terminal using small data transmission (SDT); or (ii) if the portion of data received is a normal data payload the method further comprises transmitting the portion of data to the terminal as a normal data transmission.

Optionally, the method further comprises transmitting one or more additional portions of data, where the one or more additional portions of data are small data, to the terminal using small data transmission.

Optionally, the method further comprises transmitting further information to the terminal which causes the terminal to transition to the terminal connected state.

There is also described herein an apparatus arranged to carry out a method of facilitating data transmissions in a mobile telecommunications network. The method comprises receiving, at a base station of the mobile telecommunications network, a portion of data to be transmitted to a terminal connected to the mobile telecommunications network. The method further comprises determining a transmission size indicator for the portion of data. The method further comprises providing an enhanced paging message to the terminal, the enhanced paging message including the transmission size indicator, wherein the enhanced paging message is configured to allow the terminal to determine a required terminal connection state, for receiving the portion of data, based on the transmission size indicator.

Optionally, the apparatus comprises a base station, which may be a gNodeB.

There is also described herein, computer program which, when executed by one or more processors, causes the one or more processors to carry out a method of facilitating data transmissions in a mobile telecommunications network. The method comprises receiving, at a base station of the mobile telecommunications network, a portion of data to be transmitted to a terminal connected to the mobile telecommunications network. The method further comprises determining a transmission size indicator for the portion of data. The method further comprises providing an enhanced paging message to the terminal, the enhanced paging message including the transmission size indicator, wherein the enhanced paging message is configured to allow the terminal to determine a required terminal connection state, for receiving the portion of data, based on the transmission size indicator.

There is also described herein a computer-readable medium storing a computer program which, when executed by one or more processors, causes the one or more processors to carry out a method of facilitating data transmissions in a mobile telecommunications network. The method comprises receiving, at a base station of the mobile telecommunications network, a portion of data to be transmitted to a terminal connected to the mobile telecommunications network. The method further comprises determining a transmission size indicator for the portion of data. The method further comprises providing an enhanced paging message to the terminal, the enhanced paging message including the transmission size indicator, wherein the enhanced paging message is configured to allow the terminal to determine a required terminal connection state, for receiving the portion of data, based on the transmission size indicator.

There is also described herein a method performed by a terminal of a mobile telecommunications network that is initially in a terminal inactive state. The method comprises receives an enhanced paging message. The enhanced paging message includes a transmission size indicator. The enhanced paging message may be configured to allow the terminal to determine a required terminal connection state, for receiving a portion of data, based on the transmission size indicator. The method further comprises determining a required terminal connection state, for receiving the portion of data, based on the transmission size indicator and transitioning the terminal to the required terminal connection state for receiving the portion of data.

Optionally, the method further comprises receiving the portion of data.

Optionally, (i) if the portion of data is a small data payload then the portion of data then the method further comprises receiving the portion of data using small data transmission (SDT); or (ii) if the portion of data received is a normal data payload the method further comprises receiving the portion of data as a normal data transmission.

Optionally, the method further comprises receiving one or more additional portions of data, where the one or more additional portions of data are small data, using small data transmission.

Optionally, the method further comprises receiving further information which causes the terminal to transition to the terminal connected state.

BRIEF DESCRIPTION OF THE DRAWINGS

Embodiments of the invention will now be described, by way of example only, with reference to the accompanying drawings, in which:

FIG. 4 depicts a flow chart of the method steps performed by a base station in an embodiment of the invention.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. That is, it is to be understood that the present disclosure is not limited to the particular mobile network systems, modules and devices or methods described herein. It will be evident that various modifications and changes may be made herein without departing from the broader spirit and scope of the invention as set forth in the appended claims.

Whilst the present disclosure is generally presented in the context of the 5G New Radio (NR) and/or the LTE protocols, it will be understood that the teachings of the present disclosure may apply equally to other examples of mobile telecommunications protocols. For example, the teachings presented herein may apply to any situation in which data is exchanged between a base station and a terminal. One or more devices, base stations, terminals, nodes or modules of a telecommunications network may operate in accordance with one or more standardised protocols. Suitable examples of standardised protocols may include (but are not limited to) any 3GPP standardised protocol including the Fourth Generation (4G), the Long-Term Evolution (LTE), the LTE-Advanced, the Fifth Generation (5G) and/or NR. Further, the base station described herein may be one or more of a Node B, an Evolved Node B (eNodeB) and/or a Next Generation Node B (gNodeB), and more general any radio base station that allows a user equipment (UE), such as a mobile phone, to connect to Third Generation (3G), Fourth Generation (4G) and/or Fifth Generation (5G) mobile networks. In at least some examples contemplated herein, different nodes, modules and/or devices of a telecommunications network may operate in accordance with different standardised protocols. Furthermore, a network may include one or more devices, modules and/or nodes configured to operate in accordance with a plurality of different standardised protocols.

Figure 1:
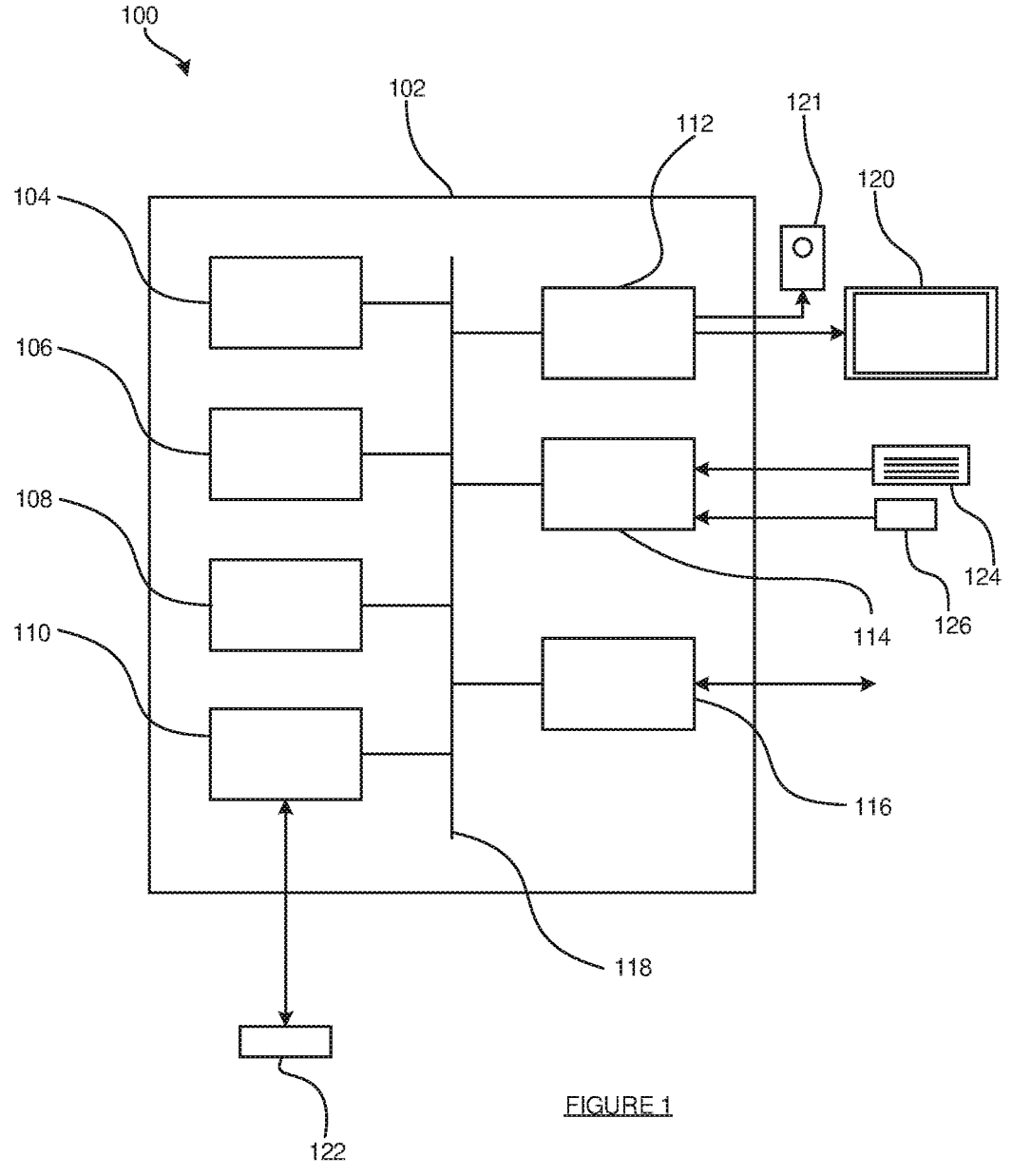
FIG. 1 schematically illustrates an example of a computer system.

FIG. 1 schematically illustrates an example of a computer system 100 which may be present at any of the one or more devices, base stations, terminals, nodes or modules of the telecommunications network described herein. The system 100 comprises a computer 102. The computer 102 comprises: a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server or cloud computer; a laptop; other mobile network devices or consumer electronics devices; etc.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

A terminal in a mobile telecommunications network may generally be understood to be any device which ends a telecommunications link and results in a signal or transmission entering or leaving the mobile telecommunications network. The terminal may be a User Equipment (UE) such as a mobile telephone; a computer terminal; a laptop computer; a network connected wearable device such as a smartwatch, heartrate/heartbeat monitor, blood pressure monitor, pacemakers, hearing aid, or other health monitoring device; a wireless sensor or sensor(s) for monitoring one or more of a pressure, temperature, humidity, or other physical or environmental condition which may form part of a Wireless Sensor Network (WSN); or any other Internet of Things (IoT) device.

Radio Resource Control (RRC) protocol is used for transmissions between two nodes in the mobile communications network for UMTS, LTE and 5G mobile networks. This protocol is specified by 3GPP in TS 25.331 for UMTS, in TS 36.331 for LTE and in TS 38.331 for 5G New Radio. The RRC protocol operates according to a number of certain specific terminal connection states that a terminal of the mobile network, such as a UE, may be present in. The different terminal connection states have different amounts of radio resources associated with them and these are the resources that the terminal may use when it is present in a given specific state. Since different amounts of network resources are available to the terminal during different terminal connection states the energy consumption of the terminal, the overall load on the mobile telecommunication network and/or the availability of network resources may be effected.

In 5G NR there are three different terminal connection states for RRC, namely RRC_IDLE, RRC_INACTIVE, and RRC_CONNECTED, which may also be referred to herein as the terminal idle state, terminal inactive state and terminal connected state respectively.

The manner in which the terminal may transition between the terminal idle state, terminal inactive state and terminal connected state is set out in 3GPP TS 38.331, version 17.1.0 (2022 Jul. 19).

If no RRC connection is established between the terminal and the base station then the terminal, such as a UE, may be considered to be in the terminal idle state (RRC_IDLE).

The terminal, may be considered to be in a terminal connected state (RRC_CONNECTED) when an RRC connection has been established between the terminal and the base station, such as a gNodeB. As described in 3GPP TS 38.331, version 17.1.0 (2022 Jul. 19)), in the terminal connected state (RRC_CONNECTED) unicast data may be transferred/transmitted to or from the terminal to the base station, multicast data may be transferred/transmitted to the terminal to the base station, and a number of additional functionalities may be performed as set out in 3GPP TS 38.331, version 17.1.0 (2022 Jul. 19). Therefore, in the terminal connected state (RRC_CONNECTED) a significant number of network resources may be allocated to the terminal and active and/or ongoing communication, such as the transmission of data, may be occurring between the terminal and the base station. The terminal may remain in the terminal connected state as long as continued, regular communication is occurring between the terminal and the base station.

In the terminal inactive state (RRC_INACTIVE) the RRC connection between the terminal and the base station is suspended as set out in 3GPP TS 38.331, version 17.1.0 (2022 Jul. 19). The terminal may move from the terminal connected state to the terminal inactive state when a significant number of network resources are no longer required and active and/or ongoing communication, such as the regular transmission of data, is no longer occurring between the terminal and the base station. The terminal may remain in the terminal inactive state as long as continued, regular communication is not occurring between the terminal and the base station.

In 5G NR the terminal inactive state, the terminal may transmit data to the base station without moving to the terminal connected state when the transmission is a small data transmission, as described below.

Small Data Transmission (SDT) generally refers to data transmission in a terminal inactive state. The inactive state refers to a state that an RRC connection is suspended, e.g., the RRC_INACTIVE state in LTE/NR standards and an RRC_IDLE state with a suspended RRC connection in LTE standards. Typically a small data transmission (SDT) is a transmission for a short data burst in a connectionless state where a device does not need to establish and subsequently teardown network connections when small amounts of data, i.e. small data payloads, need to be sent between entities on the network, such as a terminal and a base station.

In current Small Data Transmission (SDT) procedures, a terminal is able to use Small Data Transmission (SDT) to provide a small payload of data to a base station, e.g. a small data payload can be provided in the Uplink (UL) direction. Generally, a terminal will initiate the Small Data Transmission (SDT) procedure by transmitting an RRC request message to the base station and will also transmit the small data payload along with the request message, instead of transmitting the small data payload to the base station after the RRC request message has been processed.

The device performs this Small Data Transmission (SDT) procedure without transition to the connected state (i.e., without establishing or resuming an RRC connection with the base station). Small Data Transmission (SDT) enables for the base station to accept a small data payload from the terminal without signalling intensive bearer establishment and authentication procedures required for the RRC connection establishment or resume procedure.

Additionally, the terminal may not need to perform the necessary steps for resuming the RRC connection with the base station as the terminal connected state remains as a terminal inactive state, thereby prolonging the battery life of the terminal.

Small Data Transmission (SDT) may be configured by the network on a per Data Radio Bearer (DBR) basis, or per Signalling Radio Bearer (SRB) basis. Signalling Radio Bearers (SRBs) are Radio Bearers (RBs) which may be used to transmit Radio Resource Control (RRC) and Non-access stratum (NAS) messages. 3GPP TS 38.331, version 17.1.0 (2022 Jul. 19), describes four different types of Signalling Radio Bearer (SRB) in 5G New Radio (NR) defined as follows. SRB 0 is for RRC messages using the Common Control Channel (CCCH) logical channel; SRB1 is for RRC messages as well as for NAS messages prior to the establishment of SRB2, all using Dedicated Control Channel (DCCH) logical channel; SRB2 is for NAS messages, using DCCH logical channel; and SRB3 is for specific RRC messages when a terminal (such as a UE) is in 5G Evolved-Universal Terrestrial Radio Access-New Radio (EN-DC), which refers to E-UTRA NR Dual connectivity, all using DCCH logical channel.

A Data Volume Threshold is typically used for the terminal to decide whether or not to use the Small Data Transmission (SDT) procedure. This Data Volume Threshold may be up to 96,000 bytes, preferably between 32 and 9000 bytes. As such, Small Data Transmission (SDT) may be used for a payload of up to 96,000 bytes, preferably between 32 and 9000 bytes.

Small Data Transmission (SDT) may be used for Industrial, Enterprise, and Consumer use of IoT devices. The example Small Data Transmission (SDT) use cases in the NR standards may be broader than that of the LTE standards. The additional use cases may come from smartphone applications to specialized devices such as wearables, sensors, and/or smart meters.

Specific examples of small data payloads that may be transmitted from a terminal to a base station using Small Data Transmission (SDT) include: Traffic from Instant Messaging services for smartphones (such as whatsapp, QQ, wechat etc.), Heart-beat/keep-alive traffic from IM/email clients and other apps, push notifications from various smartphone applications, traffic from wearables (periodic positioning information etc.) sensors (Industrial Wireless Sensor Networks transmitting temperature, pressure readings periodically or in an event triggered manner etc.) smart meters and smart meter networks sending periodic meter readings.

However, currently, small data transmission (SDT) only allows for a terminal to remain in the terminal inactive state whilst transmitting data from the terminal to the base station, i.e. in the uplink (UL) direction. If the terminal receives a paging message from the base station then the terminal will move from the terminal inactive state to the terminal connected state in order to receive the subsequent portion of data being transmitted from the base station to the terminal, i.e. in the downlink (DL) direction. Currently, the transition of the terminal from the terminal inactive state to the terminal connected state, upon receiving a paging message, occurs irrespective of the size of the portion of data being transmitted from the base station to the terminal. In particular, the transition of the terminal from the terminal inactive state to the terminal connected state, upon receiving a paging message, occurs even when the size of the portion of data being transmitted from the base station to the terminal would be considered a small data transmission (if being sent in the UL direction). Therefore, this invention seeks to solve this problem and provide a mechanism by which small data transmission (SDT) can be extended to transmissions in the DL direction as well as the UL direction.

Figure 2:
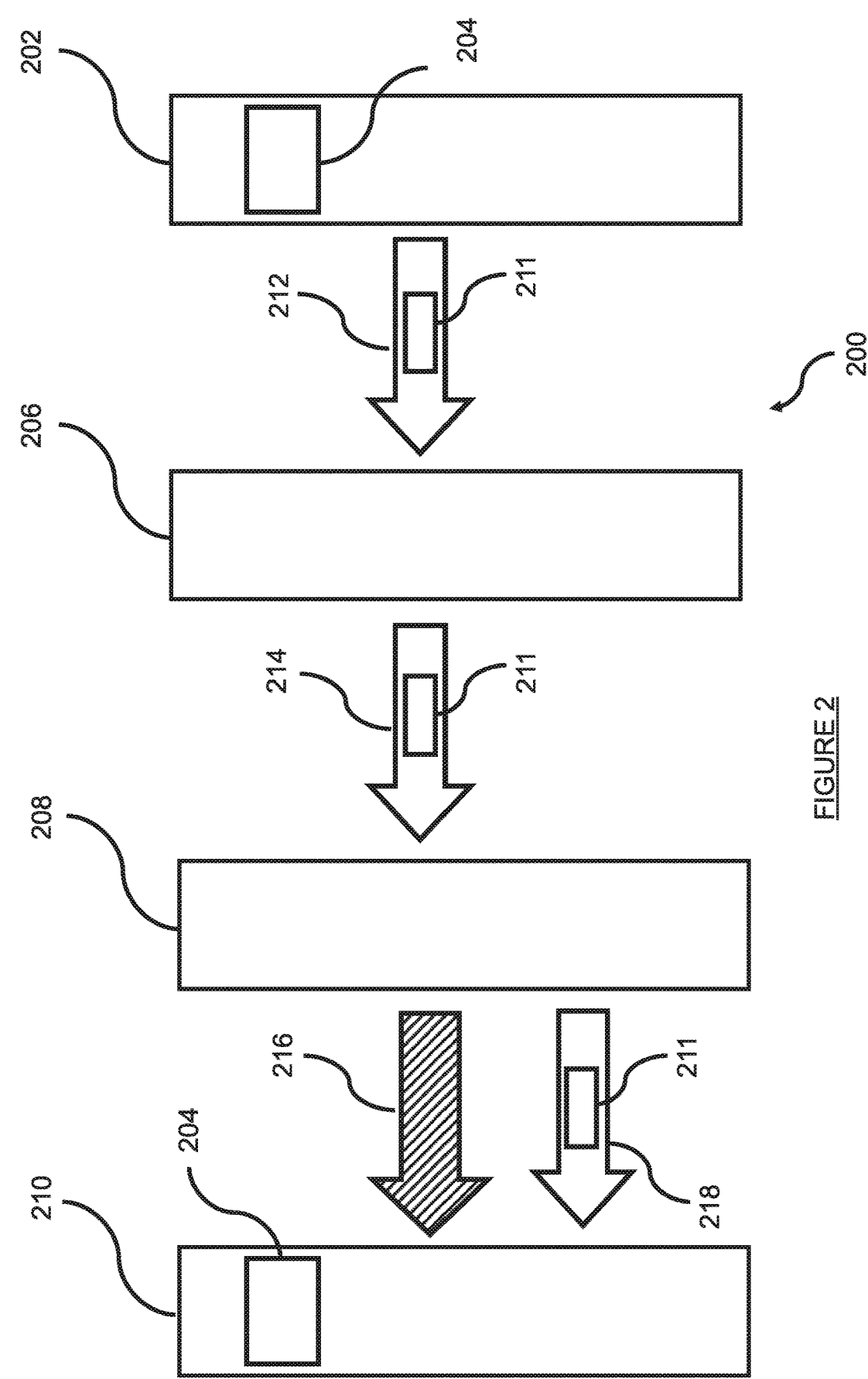
FIG. 2 depicts an example of transmissions between a base station and a terminal of a mobile communication network.

FIG. 2 shows a mobile telecommunication network, operating in accordance with current RCC protocols and small data transmission (SDT), for a transmission in the DL direction. FIG. 2 shows the existing method for sending a portion of data 211 to a terminal 210, when the terminal 210 is in a terminal inactive state. Telecommunications network 200 comprises a server 202, which may be a mobile edge computing (MEC) server. The server 202 may be running an instance of an application 204, may comprise information regarding an application requirements, such as jitter, delay, security requirements, etc., and/or may comprise information regarding application traffic patterns or application behavior. The server may be configured to transmit 212 a portion of data 211 to a User Plane Function (UPF) 206. The portion of data 211 may comprise a plurality of data packets.

The User Plane Function (UPF) 206 may be in accordance with 3GPP TS 23.501, Version 17.5.0, Section 5.8. The UPF 206 transmits 214 the portion of data 211 to a base station 208.

The base station 208 sends a paging message 216 to the terminal 210. The paging message 216 may be a one-to-one communication between the terminal 210 and the base station 208. The paging message 216 may be used to inform and notify a terminal 210 of network events, such as an incoming transmission of a portion of data 211 for the terminal 210. For example, a paging message may be used to alert a UE of an incoming call or be part of a procedure used by the network to find out a UE's location before establishing a communications channel. It will also be appreciated that paging, used in LTE and 5G NR or other standardised protocols, may have other uses or be part of other procedures each of which has its own requirements or specifications, which may also form part of the paging messages described herein.

Upon receipt of the paging message 216, the terminal 210 will move from its current state, which is the terminal inactive state, to the terminal connected state in anticipation of the transmission 218 of the portion of data 211 from the base station 208 to the terminal 210.

The portion of data 211 is then transmitted 218 from the base station 208 to the terminal 210 when the terminal 210 is in the terminal connected state. The terminal 210 may be running an instance of an application 204 and the portion of data 211 may be related to the application 204.

As shown in FIG. 2, currently, the transition of the terminal 210 from the terminal inactive state to the terminal connected state, upon receiving the paging message 216, occurs irrespective of the size of the portion of data 211 being transmitted 216 from the base station 208 to the terminal 210. In particular, the transition of the terminal 210 from the terminal inactive state to the terminal connected state, upon receiving the paging message 216, occurs even when the size of the portion of data 211 being transmitted 218 from the base station 208 to the terminal 210 could be a small data transmission.

Embodiments of the present invention enable the base station to provide an enhanced paging message to the terminal. The enhanced paging message is a paging message which includes a transmission size indicator for a portion of data to be transmitted from the base station to the terminal. The transmission size indicator provided by the base station to the terminal is configured such that it allows the terminal to determine a required terminal connection state for receiving the portion of data.

Figure 3:
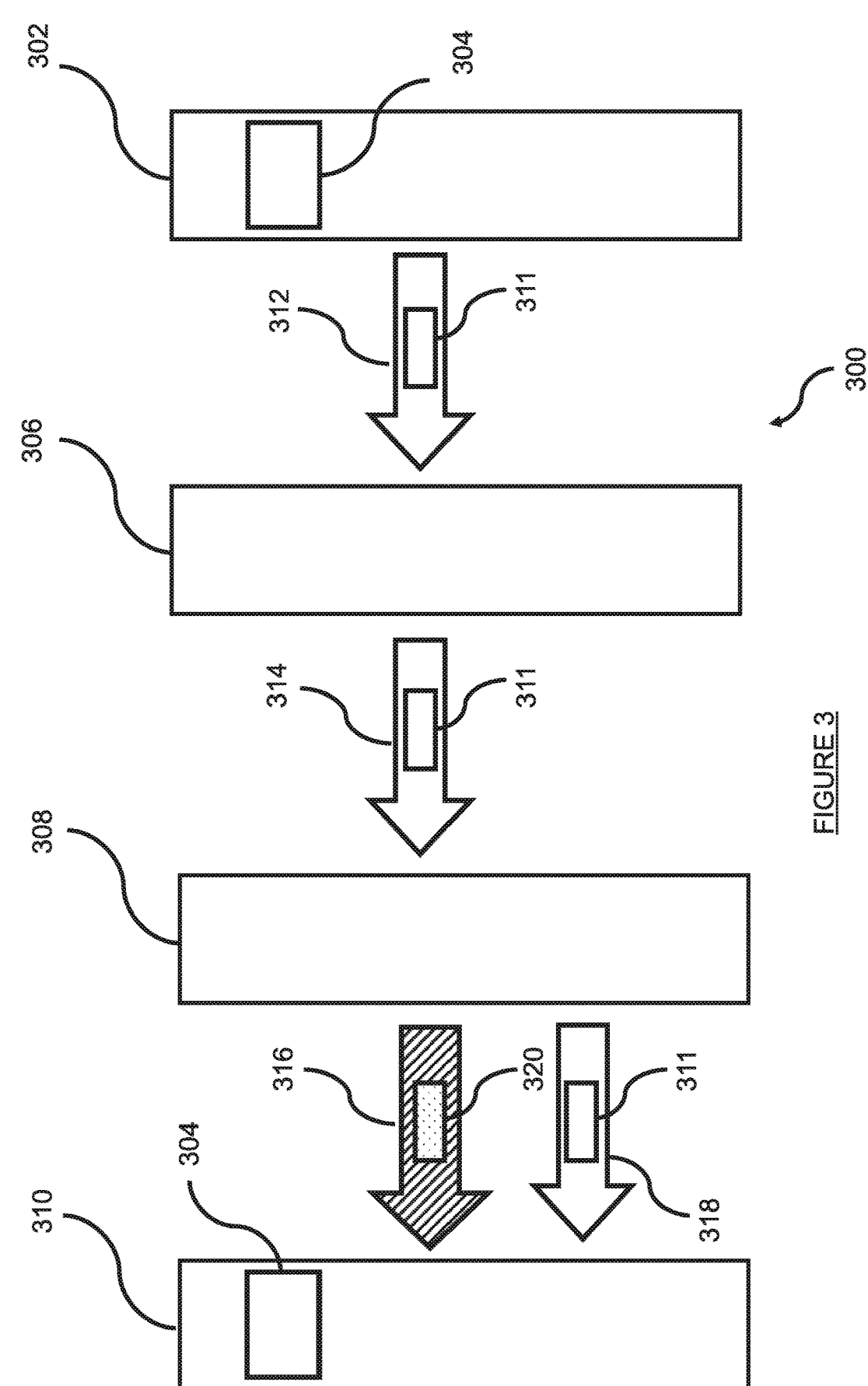
FIG. 3 depicts the transmissions between a base station and a terminal of a mobile communication network according to an embodiment of the invention.

FIG. 3 shows the operation of a telecommunications network 300 according to an embodiment of the present invention. FIG. 3 shows the operation of a telecommunications network 300 when sending a portion of data 311 to a terminal 310, when the terminal 310 is in a terminal inactive state. The terminal 310 is in the terminal inactive state when the operation shown in FIG. 3 begins. The current terminal connection state is, therefore, the terminal inactive state, when the operation shown in FIG. 3 begins. As previously described, the terminal 310 being in the terminal inactive state may occur when the terminal 310 has previously established a connection with a base station 308 but the connection is currently suspended.

The telecommunication network 300 comprises a server 302, which may be a mobile edge computing (MEC) server. The server 302 may be configured to run an instance of an application 304, may comprise information regarding application requirements, such as jitter, delay, security requirements, etc., and/or may comprise information regarding application traffic patterns or application behavior. The server may be configured to transmit 312 a portion of data 311 to a User Plane Function (UPF) 306. The portion of data 311 may comprise a plurality of data packets.

The User Plane Function (UPF) 306 may operate in accordance with 3GPP TS 23.501, Version 17.5.0, Section 5.8. The UPF 306 is configured to transmit 314 the portion of data 311 to a base station 308.

The base station 308 is configured to determine a transmission size indicator 320 for the portion of data 311. The transmission size indicator 320 for the portion of data 311 may indicate whether or not the size of the portion of data 311 is such that the portion of data 311 can be transmitted 318 to a terminal 310 using small data transmission (SDT). The transmission size indicator 320 for the portion of data 311 allows the terminal to determine which terminal transmission state is required to receive the portion of data 311 from the base station 308.

To determine a transmission size indicator 320 for the portion of data 311 the base station 308 may determine if the portion of data 311 is a small data payload. The portion of data 311 may be a small data payload if it is sized such that small data transmission (SDT) can be used by the terminal 310 to receive the portion of data 311 from the base station 308.

The determination of whether or not the portion of data 311 is a small data payload, such that small data transmission (SDT) can be used by the terminal 310 to receive the portion of data 311 from the base station 208, can be accomplished in a variety of different ways, at least some of which are set out in the various embodiments described herein. Additionally, the portion of data 311 being a small data payload may vary according to individual system or device requirements of the terminal 310, network infrastructure/hardware/software capabilities, or requirements, of the telecommunications network 300 including the one or more standardised protocols within which the telecommunication network 300 operating, the configuration of the base station 308, or any combination thereof.

The payload of the portion of data 311 may be smaller than a preconfigured threshold to define a small data payload in some embodiments. The preconfigured threshold may be set by subscription or network operator policy in some embodiments.

The preconfigured threshold may be up to 96,000 bytes, but may preferably be between 32 and 9000 bytes. As such, Small Data Transmission (SDT) may be used for a payload of up to 96,000 bytes, but may preferably be between 32 and 9000 bytes.

The preconfigured threshold may also be dynamically varied or dynamically variable based on a Signal Level or a Signal Strength, such as Reference Signal Received Power (RSRP)—which may be the average power received from a single Reference signal, which for 5G NR may have a typical range of around −31 decibels per milliwatt (dBm), which may be considered a good signal, to −156 decibels per milliwatt (dBm), which may be considered a bad signal. Reference Signal Received Quality (RSRQ), which Indicates quality of the received signal, and its range is typically −43 dB, which may be considered a bad signal, to 20 dB, which may be considered a good signal. Received Signal Strength Indicator (RSSI)—Represents the entire received power including the wanted power from the serving cell as well as all co-channel power and other sources of noise and it is related to the above parameters and may typically have a value of −120 dBm, which may considered a bad signal, to −13 dBm, which may be considered a good signal.

The Signal Level or a Signal Strength may be provided to the terminal by the base station and may indicate the amount of network resources required to transmit a data payload or a portion of data.

For example, if the value of the RSRP, RSRQ and/or RSSI indicate that there is a good signal then Small Data Transmission (SDT) may be used to transmit a greater data payload using SDT than if the value of the RSRP, RSRQ and/or RSSI indicate that there is a bad signal. This is because the amount of network resources required to transmit the data payload is smaller when there is a good signal than when there is a bad signal because less network resources are required to compensate for signal noise and interference during transmission of the data payload.

If the base station 310 determines that the portion of data 311 is a small data payload, the transmission size indicator will indicate that the portion of data 311 is sized such that small data transmission (SDT) can be used by the terminal 310 to receive the portion of data 311 from the base station 208. That is, the transmission 318 of the portion of data 311, from the base station 308, to the terminal 310, is a small data transmission.

If the transmission size indicator 320 indicates that the portion of data 311 is sized such that small data transmission (SDT) can be used by the terminal 310 to receive the portion of data 311 from the base station 208, then the terminal 310 can remain in the terminal inactive state to receive the portion of data 311. That is, the transmission size indicator 320 may allow the terminal 310 to determine that the required terminal transmission state for receiving the portion of data 311 from the base station 308 is the terminal inactive state.

Alternatively, if the base station 310 determines that the portion of data 311 is not small data, transmission size indicator 320 indicates that the portion of data 311 is sized such that small data transmission (SDT) cannot be used by the terminal 310 to receive the portion of data 311 from the base station 208. That is, the transmission 318 of the portion of data 311, from the base station 308, to the terminal 310, is not a small data transmission.

If the portion of data 311 is sized such that small data transmission (SDT) cannot be used by the terminal 310 to receive the portion of data 311 from the base station 208, then the terminal 310 cannot remain in the terminal inactive state to receive the portion of data 311. That is, the transmission indicator 320 may allow the terminal 310 to determine that the required terminal transmission state for receiving the portion of data 311 from the base station 308 is the terminal connected state.

After the base station 308 has determined a transmission size indicator 320 for the portion of data 311, the base station 308 is configured to provide an enhanced paging message 316 to the terminal 310, where the enhanced paging message 316 includes the transmission size indicator 320. The enhanced paging message 316 is a paging message 216, as described in accordance with FIG. 2 above, which further includes the transmission size indicator 320. The enhanced paging message 316 is configured to allow the terminal 310 to determine a required terminal connection state, for receiving the portion of data 311, based on the transmission size indicator 320.

The transmission size indicator 320 may be a cause value. Generally, a cause code provides a summary of information to the terminal relating to an incoming transmission or outgoing transmission as well as the failure thereof. The transmission size indicator 320 may a cause value which indicates that the portion of data 311 is a small data payload, or the cause value may indicate that the portion of data is normal or regular data payload.

Typical cause values for a failed establishment or modification of a Radio Access Bearer (RAB) are: "Requested Traffic Class not Available", "Invalid RAB Parameters Value", "Requested Maximum Bit Rate not Available", "Requested Guaranteed Bit Rate not Available", "Requested Transfer Delay not Achievable", "Invalid RAB Parameters Combination", "Condition Violation for SDU Parameters", "Condition Violation for Traffic Handling Priority", "Condition Violation for Guaranteed Bit Rate", "User Plane Versions not Supported", "Iu UP Failure".

For EMM and ESM Causes, the Cause Value field contains the cause value as specified in 3GPP TS 24.301, V17.7.0 (24 Jun. 2022). If the Protocol is S1AP, the cause value contains the specified value as in 3GPP TS 36.413, V17.1.0 (23 Jun. 2022).

The terminal 310 may be in the terminal inactive state when the enhanced paging message 316 is provided to the terminal 310 by the base station 308. The terminal 310 may remain in the terminal inactive state when receiving the enhanced paging message 316 from the base station 308.

The terminal 310 is configured to receive the enhanced paging message from the base station 308. The terminal 310 is configured to determine a required terminal connection state, for receiving the portion of data 311, based on the transmission size indicator 320.

If the transmission size indicator indicates that the portion of data 311 is sized such that small data transmission (SDT) can be used by the terminal 310 to receive the portion of data 311 from the base station 208, the terminal 310 determines that the required terminal transmission state for receiving the portion of data 311 from the base station 308 is the terminal inactive state.

Alternatively, if transmission size indicator 320 indicates that the portion of data 311 is sized such that small data transmission (SDT) cannot be used by the terminal 310 to receive the portion of data 311 from the base station 208, the terminal 310 determines that the required terminal transmission state for receiving the portion of data 311 from the base station 308 is the terminal connected state.

After the terminal 310 has determined a required terminal connection state the terminal may move to the required terminal connection state from its current terminal connection state, which is the terminal inactive state, if required.

If the transmission size indicator indicates that the portion of data 311 is sized such that small data transmission (SDT) can be used by the terminal 310 to receive the portion of data 311 from the base station 208, the terminal 310 will remain in the terminal inactive state.

Alternatively, if transmission size indicator 320 indicates that the portion of data 311 is sized such that small data transmission (SDT) cannot be used by the terminal 310 to receive the portion of data 311 from the base station 208, the terminal 310 will move from the current terminal connected state, the terminal inactive state, to the terminal connected state.

To move from the terminal inactive state to the terminal connected state, the terminal 310 may resume the previously established connection with a base station 308.

The base station 308 may be further configured to transmit 318 the portion of data 311 to the terminal 310.

If the portion of data 311 is sized such that small data transmission (SDT) can be used by the terminal 310 to receive the portion of data 311 from the base station 308, then the base station 308 may transmit the portion of data 311 to the terminal 310 as a small data transmission (SDT).

If the portion of data 311 is sized such that small data transmission (SDT) cannot be used by the terminal 310 to receive the portion of data 311 from the base station 308, then the base station 308 may transmit the portion of data 311 to the terminal 310 as a regular transmission, where a regular transmission may be any non-small data transmission and may also be referred to as a normal transmission. The regular transmission may have a regular data payload, which may also be referred to as a normal data payload. The regular or normal data payload may be greater than a determined small data threshold. Where the small data threshold may be up to 96,000 bytes, but may preferably be between 32 and 9000 bytes. The way in which the base station 308 transmits the portion of data 311 to the terminal 310 as a regular transmission may vary depending on the one or more standardised protocols within which the telecommunication network 300 operating, individual system or device requirements of the terminal 310, network infrastructure/hardware/software capabilities, or requirements, of the telecommunications network 300, the configuration of the base station 308, or any combination thereof.

The terminal 310 may receive the transmitted 318 portion of data 311 from the base station 308.

If the portion of data 311 is sized such that small data transmission (SDT) was used by the terminal 310 to transmit the portion of data 311 to the terminal 310 as a small data transmission (SDT), the terminal 310 may receive the portion of data 311 in as a small data transmission (SDT). The terminal 310 receiving the portion of data 311 as a small data transmission (SDT) occurs whilst the terminal 310 is in the terminal inactive mode.

If the portion of data 311 is sized such that the base station 308 transmitted the portion of data 311 to the terminal 310 as a regular transmission, where a regular transmission may be any non-small data transmission and may also be referred to as a normal transmission, then the terminal 310 may receive the portion of data 311 as a regular transmission. The terminal 310 receiving the portion of data 311 as a regular transmission occurs whilst the terminal 310 is in the terminal connected state.

The terminal 310 may process the portion of data 311 and perform one or more actions based on a contents of the portion of data 311. The contents of the portion of data 311 may comprise one or more instructions for the terminal 310. The terminal 310 may move from the current terminal connected state to a different terminal connected state based on the contents of the portion of data 311. For example, the terminal 310, may move from the terminal inactive state to the terminal idle state. The terminal 310 may switch off or power down based on the contents of the portion of data 311. The terminal 310 may alter its behaviour in a manner defined by the contents of the portion of data 311, such as performing one or more additional functionalities of the terminal 310, stopping one or more currently active functionalities of the terminal 310, changing a frequency or periodicity with which one or more functionalities of the terminal 310 are performed, or any combination thereof.

For example, if the terminal is a wireless sensor for monitoring one or more of a pressure, temperature, humidity, or other physical or environmental condition which may form part of a Wireless Sensor Network (WSN), then the portion of data 311 may comprise one or more instructions for the wireless sensor or sensor(s). The instructions may cause the sensor to change the frequency/rate at which it is providing data to the base station. The instructions may cause the sensor switch off or power down, this may allow a malfunctioning or faulty sensor to be easily and efficiently removed from the WSN without unnecessarily reallocating resources.

The embodiment of the invention described above allows for a more flexible and efficient telecommunication network. In particular, because the terminal 310 is able to receive a portions of data 311 as a Small Data Transmission (SDT), such that the terminal is able to remain in the terminal inactive state, when the portion of data 311 is a small data payload, the terminal 310 does not need to always resume the previously established connection with the base station 308. This allows the resources of the telecommunications network to be allocated more efficiently, as resources are not be unnecessarily co-opted to transmit a small data payload, whilst retaining flexibility, because the resources can be allocated to establishing the communication channel between the terminal 310 and the base station when required.

FIG. 4 depicts a flow diagram of a method of facilitating data transmissions in a mobile telecommunications network 300, which may occur at a base station 308, in accordance with the current invention.

The method comprises a first step of receiving 410, at a base station 308 of the mobile telecommunications network 300, a portion of data 311 to be transmitted to a terminal 310 connected to the mobile telecommunications network 300.

The method comprises a second step of determining 420 a transmission size indicator 320 for the portion of data.

The method further comprises a third step of providing 430 an enhanced paging message 316 to the terminal 310, the enhanced paging message 316 including the transmission size indicator 320, wherein the enhanced paging message 316 is configured to allow the terminal 310 to determine a required terminal connection state, for receiving the portion of data 311, based on the transmission size indicator 320.

Figure 5A:
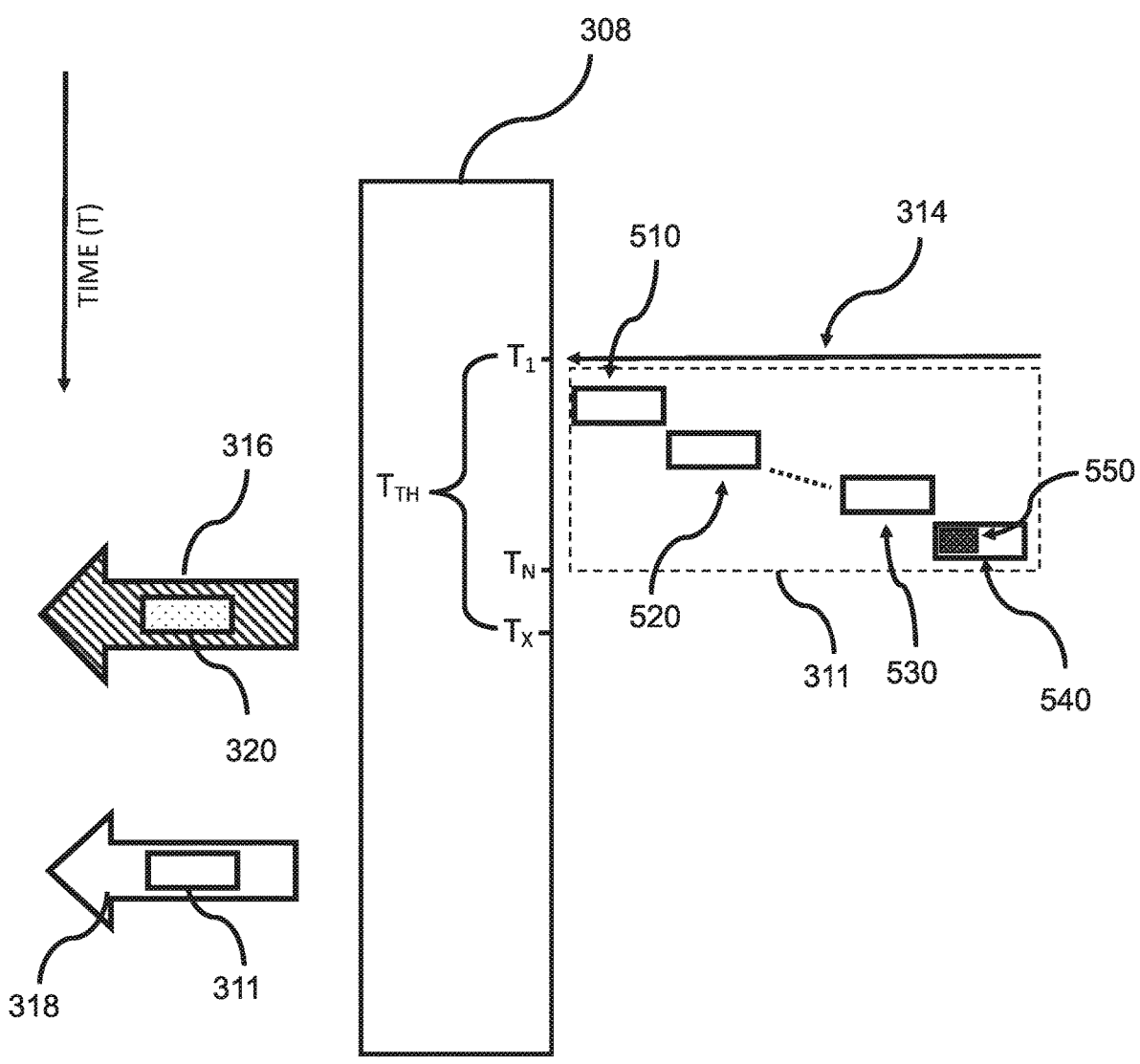
FIG. 5A depicts the transmissions between a base station and a terminal of a mobile communication network according to an embodiment of the invention.
Figure 5B:
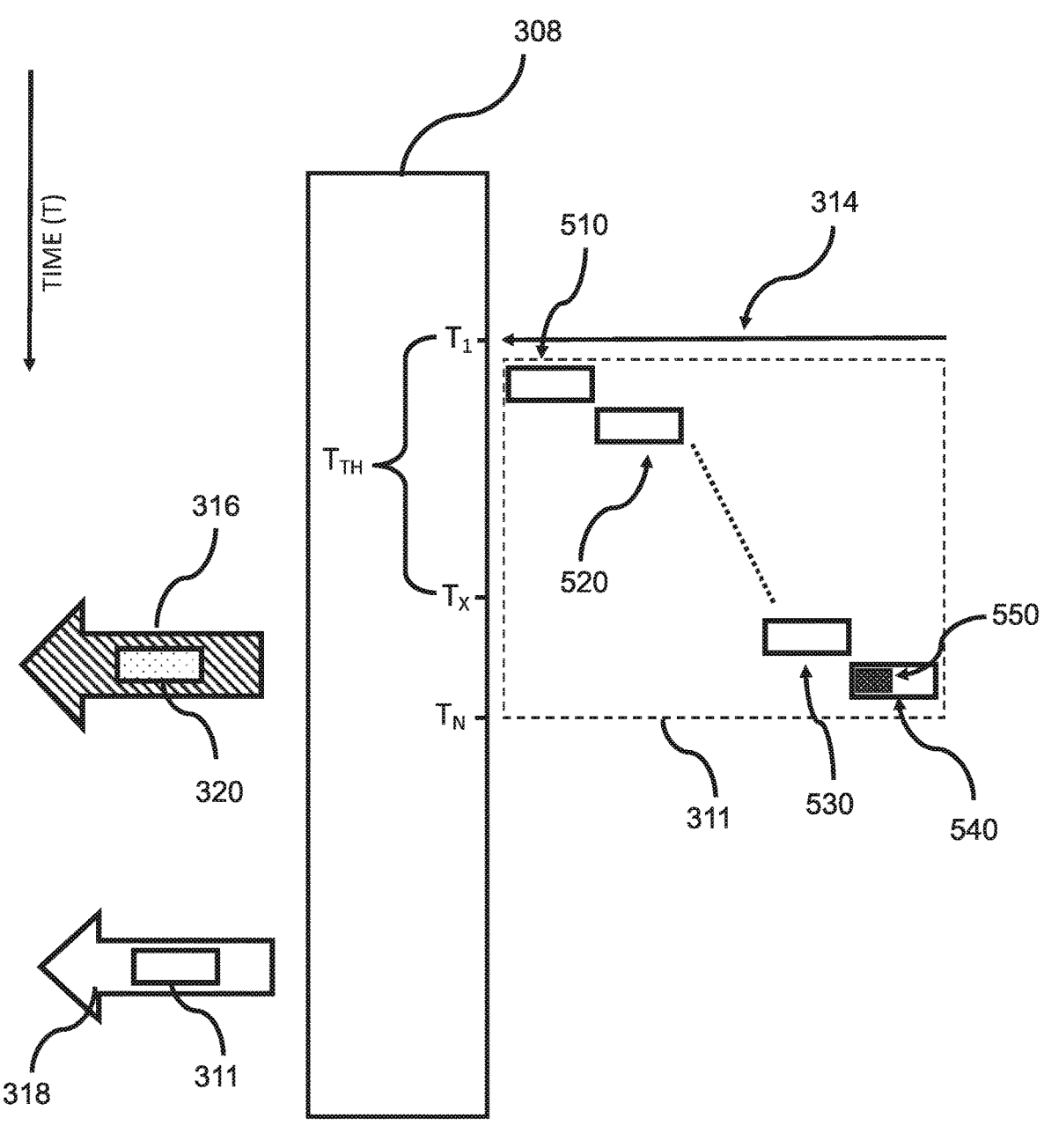
FIG. 5B depicts the transmissions between a base station and a terminal of a mobile communication network according to an embodiment of the invention.

FIGS. 5A and 5B depict the incoming and outgoing transmissions of the base station 308 in an embodiment of the invention in two different scenarios.

The base station 308, is configured to receive a transmission 314 of the portion of data 311 from the UPF 306.

The portion of data 311 may comprise a plurality of data packets. The plurality of data packets may comprise a first data packet 510, a second data packet 520, . . . , an N-1$^{th}$ data packet 530 and a final data packet 540, which may also be referred to as the N$^{th}$ data packet, where N is a positive integer greater than 1.

The final data packet 540 of the plurality of data packets may comprise an end marker 550. The end marker indicates that the portion of data 311 ends with the data packet comprising the end marker. That is, the end marker indicates that the data packet, of the plurality of data packets, comprising the end marker 550 is the final data packet 540 of the portion of data 311.

The end marker may be implemented in accordance with 3GPP TS 29.281 Section 7.3.2. Generally, such an end marker will be included in the transmission provided to the base station 308 from the UPF 306.

Similarly to FIG. 3 above, the base station 308 is configured to determine a transmission size indicator 320 for the portion of data 311. The transmission size indicator 320 for the portion of data 311 may indicate whether or not the size of the portion of data 311 is such that the portion of data 311 can be transmitted 318 to a terminal 310 using small data transmission (SDT). The transmission size indicator 320 for the portion of data 311 allows the terminal to determine which terminal transmission state is required to receive the portion of data 311 from the base station 308.

To determine a transmission size indicator 320 for the portion of data 311 the base station 308 may determine if the portion of data 311 is a small data payload. The portion of data 311 may be a small data payload if it is sized such that small data transmission (SDT) can be used by the terminal 310 to receive the portion of data 311 from the base station 208.

In the embodiment of the invention shown in FIGS. 5A and 5B, the base station 308 determines if the portion of data 311 is a small data payload, and thus determines the transmission size indicator 320, based on whether the end marker 550 is received within a threshold time, $T_{TH}$.

The threshold time $T_{TH}$ may vary based on the size threshold for the portion of data 311 being a small data payload. Similarly to the threshold for the portion of data 311 being considered a small data payload, the time threshold $T_{TH}$ may vary according to individual system or device requirements of the terminal 310, network infrastructure/hardware/software capabilities, or requirements, of the telecommunications network 300 including the one or more standardised protocols within which the telecommunication network 300 operating, the configuration of the base station 308, or any combination thereof. Typically, the duration of the threshold time $T_{TH}$ directly corresponds to the size threshold for the portion of data 311 being a small data payload.

For example, a first terminal operating on a telecommunications network, may have size threshold for the portion of data 311 being a small data payload of $S_A$ and a corresponding threshold time of $T_{THA}$. A second terminal operating on the telecommunications network may have a different size threshold for the portion of data 311 being a small data payload of $S_B$ and a corresponding threshold time of $T_{THB}$. If the value of $S_A$ is greater than $S_B$, then a larger amount of data can be transferred using a small data transmission for the first terminal than the second terminal, e.g. a portion of data capable of being transmitted to the first terminal using a small data transmission may comprise a greater number of data packets than a portion of data capable of being transmitted to the second terminal using a small data transmission. Typically if the value of $S_A$ is greater than $S_B$ then value of $T_{THA}$ will be greater than $T_{THB}$. As such, there may be a longer time within which the portion of data, specifically the end marker included in the final data packet, can be received by the base station for the first terminal, due to their being a greater amount of data packets capable of being transmitted to the first terminal using a small data transmission.

The size threshold for the portion of data 311 being a small data payload may be up to 96,000 bytes, but may preferably be between 32 and 9000 bytes. As such, Small Data Transmission (SDT) may be used for a payload of up to 96,000 bytes, but may preferably be between 32 and 9000 bytes.

The size threshold, and the threshold time $T_{TH}$, may also be dynamically varied or dynamically variable based on a Signal Level or a Signal Strength, such as Reference Signal Received Power (RSRP)—which may be the average power received from a single Reference signal, which for 5G NR may have a typical range of around −31 decibels per milliwatt (dBm), which may be considered a good signal, to −156 decibels per milliwatt (dBm), which may be considered a bad signal. Reference Signal Received Quality (RSRQ), which Indicates quality of the received signal, and its range is typically −43 dB, which may be considered a bad signal, to 20 dB, which may be considered a good signal. Received Signal Strength Indicator (RSSI)—Represents the entire received power including the wanted power from the serving cell as well as all co-channel power and other sources of noise and it is related to the above parameters and may typically have a value of −120 dBm, which may considered a bad signal, to −13 dBm, which may be considered a good signal.

The Signal Level or a Signal Strength may be provided to the terminal by the base station and may indicate the amount of network resources required to transmit a data payload or a portion of data.

For example, if the value of the RSRP, RSRQ and/or RSSI indicate that there is a good signal then Small Data Transmission (SDT) may be used to transmit a greater data payload using SDT than if the value of the RSRP, RSRQ and/or RSSI indicate that there is a bad signal. This is because the amount of network resources required to transmit the data payload is smaller when there is a good signal than when there is a bad signal because less network resources are required to compensate for signal noise and interference during transmission of the data payload.

FIG. 5A shows a first scenario in accordance with this embodiment of the invention, in which the portion of data 311, is received within the threshold time, $T_{TH}$. The first data packet 510 is received at a time $T_1$, the base station 308 may determine a cut-off time, $T_X$, by which the final data packet 540 of the plurality of data packets have to be received for the portion of data 311 to be determined to be a small data payload. The time between the time at which the first data packet is received, $T_1$, and the cut-off time, $T_X$, is the threshold time, $T_{TH}$.

In the scenario shown in FIG. 5A, the final data packet 540 is received at time $T_N$, where $T_N$ is before the cut-off time, $T_X$, such that the final data packet 540 has been received within the threshold time, $T_{TH}$, from the receipt of the first data packet 510 at time, $T_1$.

The base station 308 may determine the time at which the last data packet 540 is received based on receiving the end marker 550. As such, time $T_N$ may be the time at which the base station 308 receives the end marker 500.

The base station 308 determines that the portion of data 311 is a small data payload because all data packets of the plurality of data packets, which form the portion of data 311, have been received within the threshold time, $T_{TH}$. The portion of data 311 being a small data payload means that it is sized such that small data transmission (SDT) can be used by the terminal 310 to receive the portion of data 311 from the base station 308, thereby allowing transmission of the portion of data 311 from the base station 308 to the terminal while the terminal 310 is in the terminal inactive mode.

The determination that the portion of data 311 is a small data payload may occur, or begin, once the last data packet of the plurality of data packets was received by the base station 308, at a time $T_N$, but before the expiry of the threshold time, $T_{TH}$, from the receipt of the first data packet 510 at time $T_1$. That is, the determination that the portion of data 311 is a small data payload may occur, or begin, after time $T_N$, but before the cut-off time $T_X$. Whilst the determination that the portion of data 311 is a small data payload may begin after time $T_N$, but before the cut-off time $T_X$, the actual determination that the portion of data is a small data payload may occur after the expiry of the threshold time, $T_{TH}$, i.e. after the cut-off time $T_X$.

Alternatively, the base station 308 may wait until the expiry of the threshold time, $T_{TH}$, from the receipt of the first data packet 510 at time $T_1$, to determine, or begin the determination of, whether the portion of data 311 is a small data payload. The base station 308 may determine that the portion of data 311 is a small data payload based on whether the final data packet 540, which comprises the end marker 550, was received before the cut-off time $T_X$, i.e. whether $T_N$ was before the cut-off time $T_X$, after the expiry of the threshold time, $T_{TH}$, from the receipt of the first data packet 510 at time $T_1$. That is, the determination that the portion of data 311 is a small data payload may occur, or begin, after the cut-off time $T_X$.

The base station 308 determines the transmission size indicator 320 for the portion of data 311 based on the determination that the portion of data 311 is a small data payload because all data packets of the plurality of data packets, which form the portion of data 311, were received within the threshold time, $T_{TH}$. As a result, the base station determines that the transmission size indicator 320 is a small data payload indicator. That is, the transmission size indicator 320 is configured such that the transmission size indicator 320 being a small data payload indicator allows the terminal 310 to determine that the portion of data 311 is a small data payload.

Once the base station 308 has determined the transmission size indicator 320, it is provided 316 to the terminal 320.

The base station 308 is configured to provide the transmission size indicator 320 to the terminal using an enhanced paging message 316. The enhanced paging message 316 is a paging message 216, as described in accordance with FIG. 2 above, which further includes the transmission size indicator 320.

The transmission size indicator 320 may be a cause value, in accordance with FIG. 3 described above.

In the embodiment of FIG. 5A, the enhanced paging message 316 provided by the base station 308 to the terminal 310 is a paging message that further includes the determined size indicator 320, which is a small data payload indicator. As such, the base station 308 provides an enhanced paging message 316 including a small data payload indicator to the terminal 310.

The enhanced paging message 316 may be provided to the terminal 310 once the determination of the transmission size indicator 320 has occurred. Therefore, if the determination that the portion of data 311 is a small data payload occurs, or begins, once the last data packet of the plurality of data packets was received by the base station 308, at a time $T_N$, but before the expiry of the threshold time, $T_{TH}$, from the receipt of the first data packet 510 at time $T_1$, then the enhanced paging message 316 may be provided to the terminal 310 before the expiry of the threshold time, $T_{TH}$, from the receipt of the first data packet 510 at time $T_1$. That is, if the determination that the portion of data 311 is a small data payload occurs, or begins, after time $T_N$, but before the cut-off time $T_X$, then the enhanced paging message 316 may also be provided to the terminal 310 before the cut-off time. Whilst the determination that the portion of data 311 is a small data payload may begin after time $T_N$, but before the cut-off time $T_X$, the actual determination that the portion of data is a small data payload may occur after the expiry of the threshold time, $T_{TH}$, i.e. after the cut-off time $T_X$. As such, the enhanced paging message 316 may also be provided to the terminal 310 after the cut-off time $T_X$, where the determination that the portion of data is a small data payload begins prior to the expiry of the threshold time, $T_{TH}$, i.e. before the cut-off time $T_X$.

Alternatively, if the base station 308 waits until the expiry of the threshold time, $T_{TH}$, from the receipt of the first data packet 510 at time $T_1$, to determine, or begin the determination of, whether the portion of data 311 is a small data payload, then the enhanced paging message 316 will be provided to the terminal 310 after the cut-off time $T_X$.

The terminal 310 may be in the terminal inactive state when the enhanced paging message 316 is provided to the terminal 310 by the base station 308. The terminal 310 may remain in the terminal inactive state when receiving the enhanced paging message 316 from the base station 308.

The enhanced paging message 316 is configured to allow the terminal 310 to determine a required terminal connection state, for receiving the portion of data 311, based on the transmission size indicator 320.

In the scenario shown in FIG. 5A, the enhanced paging message 316 is configured to allow the terminal 310 to determine a required terminal connection state, for receiving the portion of data 311, based on the transmission size indicator 320 being a small data payload indicator. The terminal 310 may, therefore, determine that the required terminal connection state, for receiving the portion of data 311, is the terminal inactive state based on the transmission size indicator 320 being a small data payload indicator.

The base station 308 may then transmit 318 the portion of data 311 to the terminal 310. The transmission 318 of the portion of data 311 of FIG. 5A may be a small data transmission (SDT). The transmission 318 of FIG. 5A may transmit the portion of data 311, which was determined to be a small data payload, as a small data transmission (SDT).

FIG. 5B shows a second scenario in accordance with this embodiment of the invention, in which the portion of data 311, is not received within the threshold time, $T_{TH}$. The first data packet 510 is received at a time $T_1$, the base station 308 may determine a cut-off time, $T_X$, by which the final data packet 540 of the plurality of data packets have to be received for the portion of data 311 to be determined to be a small data payload. The time between the time at which the first data packet is received, $T_1$, and the cut-off time, $T_X$, is the threshold time, $T_{TH}$.

In the scenario shown in FIG. 5B, the final data packet 540 is received at time $T_N$, where $T_N$ is after the cut-off time, $T_X$, such that the final data packet 540 has not been received within the threshold time, $T_{TH}$, from the receipt of the first data packet 510 at time, $T_1$.

The base station 308 may determine the time at which the last data packet 540 is received based on receiving the end marker 550. As such, time $T_N$ may be the time at which the base station 308 receives the end marker 500.

The base station 308 determines that the portion of data 311 is not a small data payload, such that the portion of data 311 is a regular or normal data payload, because all data packets of the plurality of data packets, which form the portion of data 311, have not been received within the threshold time, $T_{TH}$. The portion of data 311 being regular or normal data payload means that it is sized such that small data transmission (SDT) cannot be used by the terminal 310 to receive the portion of data 311 from the base station 208. Therefore, the transmission of the portion of data 311 from the base station 308 to the terminal 310 may not occur while the terminal 310 is in the terminal inactive mode. Instead, the transmission of the portion of data 311 from the base station 308 to the terminal 310 has to occur while the terminal 310 is in the terminal connected mode.

The base station 308 determines the transmission size indicator 320 for the portion of data 311 based on the determination that the portion of data 311 is not a small data payload, and instead is regular or normal data payload, because all data packets of the plurality of data packets, which form the portion of data 311, were not received within the threshold time, $T_{TH}$. As a result, the base station determines that the transmission size indicator 320 is a regular or normal data payload indicator. That is, the transmission size indicator 320 is configured such that the transmission size indicator 320 being a regular or normal data payload indicator allows the terminal 310 to determine that the portion of data 311 is regular or normal data payload.

Once the base station 308 has determined the transmission size indicator 320, it is provided 316 to the terminal 320. The base station 308 is configured to provide the transmission size indicator 320 to the terminal using an enhanced paging message 316. The enhanced paging message 316 is a paging message 216, as described in accordance with FIG. 2 above, which further includes the transmission size indicator 320.

The transmission size indicator 320 may be a cause value, in accordance with the embodiment of FIG. 3 described above.

In the embodiment of FIG. 5B, the enhanced paging message 316 provided by the base station 308 to the terminal 310 is a paging message that further includes the determined size indicator 320, which is a normal or regular data indicator. As such, the base station 308 provides an enhanced paging message 316 including a normal or regular data indicator to the terminal 310.

The enhanced paging message 316 is configured to allow the terminal 310 to determine a required terminal connection state, for receiving the portion of data 311, based on the transmission size indicator 320.

The terminal 310 may be in the terminal inactive state when the enhanced paging message 316 is provided to the terminal 310 by the base station 308. The terminal 310 may remain in the terminal inactive state when receiving the enhanced paging message 316 from the base station 308.

In the scenario shown in FIG. 5B, the enhanced paging message 316 is configured to allow the terminal 310 to determine a required terminal connection state, for receiving the portion of data 311, based on the transmission size indicator 320 being a regular or normal data payload indicator. The terminal 310 may, therefore, determine that the required terminal connection state, for receiving the portion of data 311, is the terminal connected state based on the transmission size indicator 320 being a normal or regular data indicator.

The base station 308 may then transmit 318 the portion of data 311 to the terminal 310. The transmission 318 of the portion of data 311 of FIG. 5B may be a regular or normal data payload transmission which is transmitted in accordance with the one or more standards protocols under which the base station 308 is operating. The transmission 318 of FIG. 5B may provide the portion of data 311 to the terminal 310 as a regular or normal data payload transmission which is transmitted in accordance with the one or more standards protocols under which the base station 308 is operating.

Figure 6:
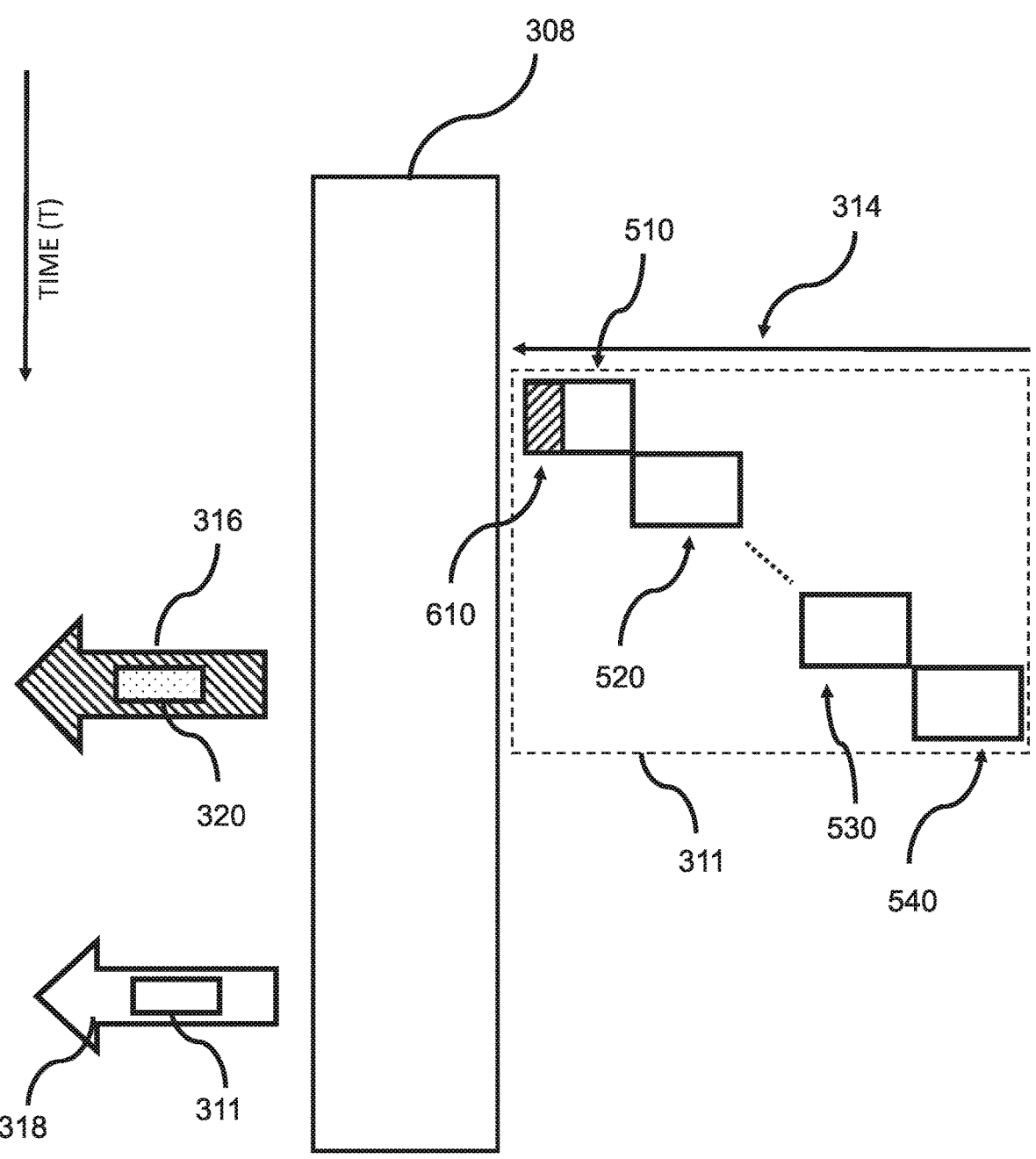
FIG. 6 depicts the transmissions between a base station and a terminal of a mobile communication network according to an embodiment of the invention.

FIG. 6 depicts the incoming and outgoing transmissions of the base station 308 in another embodiment of the invention.

The base station 308, is configured to receive a transmission 314 of the portion of data 311 from the UPF 306.

The portion of data 311 may comprise a plurality of data packets. The plurality of data packets may comprise a first data packet 510, a second data packet 520, . . . , an N−1$^{th}$ data packet 530 and a final data packet 540, which may also be referred to as the N$^{th}$ data packet, where N is a positive integer greater than 1.

Similarly to the embodiment of FIG. 3 above, the base station 308 is configured to determine a transmission size indicator 320 for the portion of data 311. The transmission size indicator 320 for the portion of data 311 may indicate whether or not the size of the portion of data 311 is such that the portion of data 311 can be transmitted 318 to a terminal 310 using small data transmission (SDT). The transmission size indicator 320 for the portion of data 311 allows the terminal to determine which terminal transmission state is required to receive the portion of data 311 from the base station 308.

To determine a transmission size indicator 320 for the portion of data 311 the base station 308 may determine if the portion of data 311 is a small data payload. The portion of data 311 may be a small data payload if it is sized such that small data transmission (SDT) can be used by the terminal 310 to receive the portion of data 311 from the base station 208.

In the embodiment of the invention shown in FIG. 6, the base station 308 determines if the portion of data 311 is a small data payload, and thus determines the transmission size indicator 320, based on received size information 610 for the portion of data 311.

The base station 308 determines whether the portion of data 311 is a small data payload by comparing the received size information 610 for the portion of data 311 to a data size threshold $S_{TH}$. The received size information 610 for the portion of data 311 may indicate the size of the portion of data 311 as a number of packets, where each packet may have a predetermined size, as a total number of bits (more preferably Kbits), and/or as a number of packets and their corresponding size as a number of bits.

The data size threshold $S_{TH}$ for the portion of data 311 being a small data payload may be up to 96,000 bytes, but may preferably be between 32 and 9000 bytes. As such, Small Data Transmission (SDT) may be used for a payload of up to 96,000 bytes, but may preferably be between 32 and 9000 bytes.

The size threshold, and the threshold time $T_{TH}$, may also be dynamically varied or dynamically variable based on a Signal Level or a Signal Strength in accordance with the embodiment described in FIG. 3 above.

The received size information 610 for the portion of data 311 may be contained within the first data packet of the plurality of data packets of the portion of data 311. Alternatively, the received size information 610 for the portion of data 311 may be contained within a first set of data packets of the plurality of data packets of the portion of data 311.

The received size information 610 may be contained within a header of the first data packet 510 or collectively contained within the headers of the first set of data packets. More specifically, a GTP-U header for the first data packet or the GTP-U headers for the first set of data packets may be enhanced to contain the size information 610 for the portion of data 311. The size information 610 for the portion of data 311 may be included in the GTP-U headed using reserved bits inside the message type field or other fields of the header.

If the received size information 610 for the portion of data 311 indicates that the portion of data 311 is less than or equal to a data size threshold $S_{TH}$, then the portion of data 311 is determined to be a small data payload. The portion of data 311 being a small data payload means that it is sized such that small data transmission (SDT) can be used by the terminal 310 to receive the portion of data 311 from the base station 308, thereby allowing transmission of the portion of data 311 from the base station 308 to the terminal while the terminal 310 is in the terminal inactive mode.

Alternatively, if the received size information 610 for the portion of data 311 indicates that the portion of data 311 is greater than the data size threshold $S_{TH}$, then the portion of data 311 is determined to not to be a small data payload. As such, such that the portion of data 311 is regular or normal data payload, because all data packets of the plurality of data packets, which form the portion of data 311, have a total size that is greater than the data size threshold $S_{TH}$, where the data size threshold $S_{TH}$ defines the upper limit of the size of data that can be sent as a small data transmission (SDT). The portion of data 311 being regular or normal data payload means that it is sized such that small data transmission (SDT) cannot be used by the terminal 310 to receive the portion of data 311 from the base station 208. Therefore, the transmission of the portion of data 311 from the base station 308 to the terminal 310 may not occur while the terminal 310 is in the terminal inactive mode. Instead, the transmission of the portion of data 311 from the base station 308 to the terminal 310 has to occur while the terminal 310 is in the terminal connected mode.

The base station 308 determines the transmission size indicator 320 for the portion of data 311 based on the determination of whether the portion of data 311 is a small data payload.

If the base station 308 determined that the portion of data is a small data payload because the received size information 610 for the portion of data 311 indicates that the portion of data 311 is less than or equal to a data size threshold $S_{TH}$, then base station determines that the transmission size indicator 320 is a small data payload indicator. That is, the transmission size indicator 320 is configured such that the transmission size indicator 320 being a small data payload indicator allows the terminal 310 to determine that the portion of data 311 is a small data payload.

Alternatively, if the base station 308 that the portion of data 311 is not a small data payload, and instead is regular or normal data payload, because all data packets of the plurality of data packets, which form the portion of data 311, have a total size that is greater than the data size threshold $S_{TH}$, then the base station determines that the transmission size indicator 320 is a regular or normal data payload indicator. That is, the transmission size indicator 320 is configured such that the transmission size indicator 320 being a regular or normal data payload indicator allows the terminal 310 to determine that the portion of data 311 is regular or normal data payload.

Once the base station 308 has determined the transmission size indicator 320, it is provided 316 to the terminal 320. The base station 308 is configured to provide the transmission size indicator 320 to the terminal using an enhanced paging message 316. The enhanced paging message 316 is a paging message 216, as described in accordance with FIG. 2 above, which further includes the transmission size indicator 320.

The transmission size indicator 320 may be a cause value, in accordance with the embodiment of FIG. 3 described above.

If the base station 308 determined that the portion of data is a small data payload, the enhanced paging message 316 provided by the base station 308 to the terminal 310 is a paging message that further includes the determined size indicator 320, which is a small data payload indicator. As such, the base station 308 provides an enhanced paging message 316 including a small data payload indicator to the terminal 310.

Alternatively, if the base station 308 determines that the portion of data is a small data payload and, instead, is regular or normal data payload, the enhanced paging message 316 provided by the base station 308 to the terminal 310 is a paging message that further includes the determined size indicator 320, which is a normal or regular data indicator. As such, the base station 308 provides an enhanced paging message 316 including a normal or regular data indicator to the terminal 310.

The terminal 310 may be in the terminal inactive state when the enhanced paging message 316 is provided to the terminal 310 by the base station 308. The terminal 310 may remain in the terminal inactive state when receiving the enhanced paging message 316 from the base station 308.

If the portion of data 311 is a small data payload, the enhanced paging message 316 is configured to allow the terminal 310 to determine a required terminal connection state, for receiving the portion of data 311, based on the transmission size indicator 320 being a small data payload indicator. The terminal 310 may, therefore, determine that the required terminal connection state, for receiving the portion of data 311, is the terminal inactive state based on the transmission size indicator 320 being a small data payload indicator.

Alternatively, if the portion of data is not a small data payload and, instead, is regular or normal data payload, the enhanced paging message 316 is configured to allow the terminal 310 to determine a required terminal connection state, for receiving the portion of data 311, based on the transmission size indicator 320 being a regular or normal data payload indicator. The terminal 310 may, therefore, determine that the required terminal connection state, for receiving the portion of data 311, is the terminal connected state based on the transmission size indicator 320 being a normal or regular data indicator.

The base station 308 may then transmit 318 the portion of data 311 to the terminal 310. The transmission 318 of the portion of data 311 may be a small data transmission (SDT) if the portion of data 311 is a small data payload. The transmission 318 may provide the portion of data 311 to the terminal 310 as a small data transmission (SDT). Alternatively, if the portion of data is not a small data payload and, instead, is regular or normal data payload, the transmission 318 of the portion of data 311 may be a regular or normal data payload transmission which is transmitted in accordance with the one or more standards protocols under which the base station 308 is operating. The transmission 318 may provide the portion of data 311 to the terminal 310, as a regular or normal data payload transmission which is transmitted in accordance with the one or more standards protocols under which the base station 308 is operating.

Figure 7:
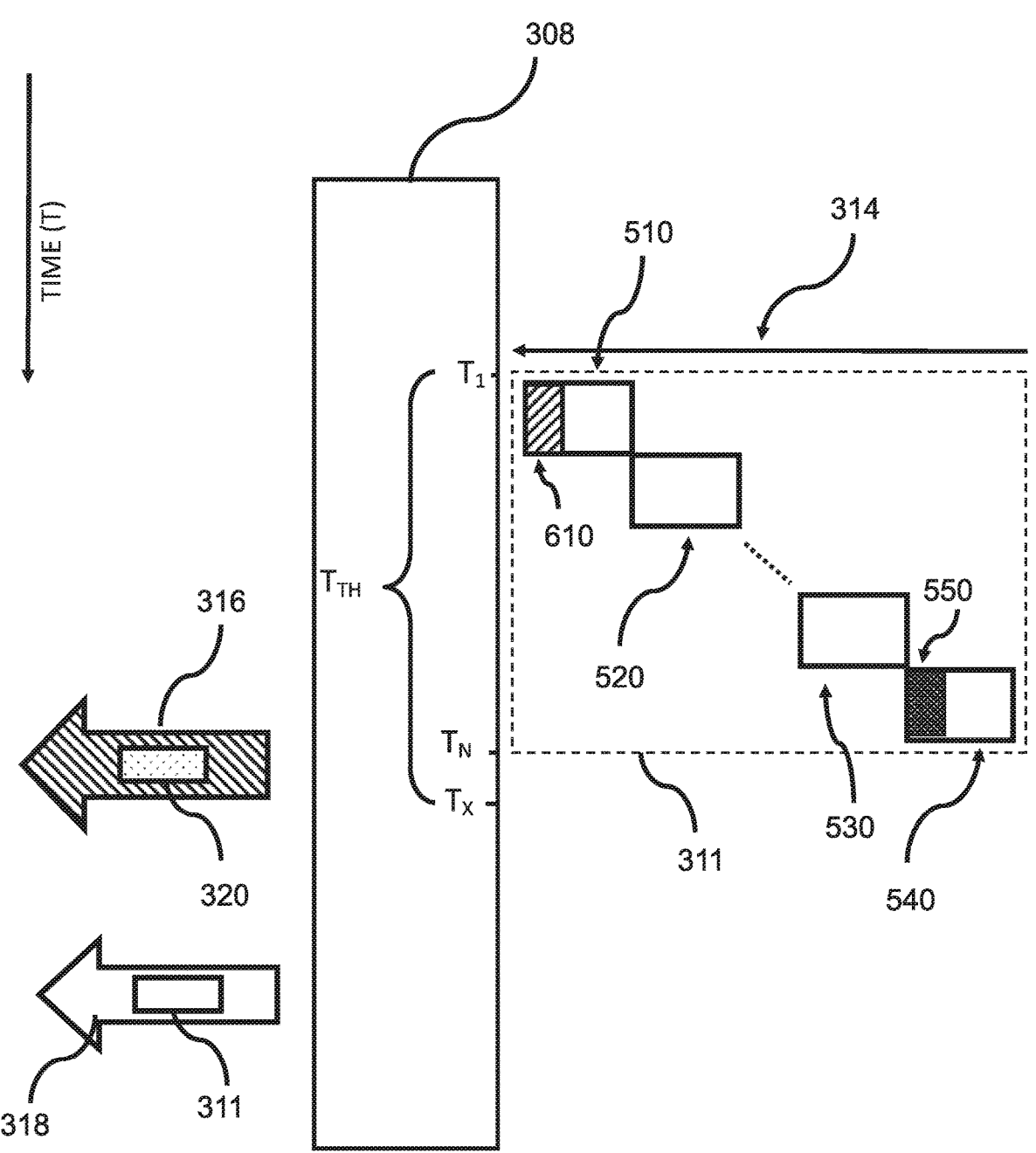
FIG. 7 depicts the transmissions between a base station and a terminal of a mobile communication network according to an embodiment of the invention.

FIG. 7 depicts the incoming and outgoing transmissions of the base station 308 in a further embodiment of the invention.

The base station 308, is configured to receive a transmission 314 of the portion of data 311 from the UPF 306.

The portion of data 311 may comprise a plurality of data packets. The plurality of data packets may comprise a first data packet 510, a second data packet 520, . . . , an $N-1^{th}$ data packet 530 and a final data packet 540, which may also be referred to as the $N^{th}$ data packet, where N is a positive integer greater than 1.

Similarly to FIG. 3 above, the base station 308 is configured to determine a transmission size indicator 320 for the portion of data 311. The transmission size indicator 320 for the portion of data 311 may indicate whether or not the size of the portion of data 211 is such that the portion of data 311 can be transmitted 318 to a terminal 310 using small data transmission (SDT). The transmission size indicator 320 for the portion of data 311 allows the terminal to determine which terminal transmission state is required to receive the portion of data 311 from the base station 308.

To determine a transmission size indicator 320 for the portion of data 311 the base station 308 may determine if the portion of data 311 is a small data payload. The portion of data 311 may be a small data payload if it is sized such that small data transmission (SDT) can be used by the terminal 310 to receive the portion of data 311 from the base station 208.

In the embodiment of FIG. 7 the base station 308 may operate in accordance with either or both of the previously described embodiments, namely the embodiment described in FIGS. 5A and 5B and/or the embodiment described in FIG. 6.

The base station 308 of the embodiment shown in FIG. 7 may be configured to determine if the portion of data 311 is a small data payload, and thus determine the transmission size indicator 320, based on whether an end marker 550 is received within a threshold time, $T_{TH}$. The base station 308 may also be configured to determine if the portion of data 311 is a small data payload, and thus determine the transmission size indicator 320, based on received size information 610 for the portion of data 311.

For example, the base station 308 may be configured to determine the transmission size indicator 320 based on the received size information 610 where said size information is provided to the base station 308, in accordance with the embodiment shown in FIG. 6 as previously described. If the base station 308 does not receive size information for the portion of data 311 the base station 308 may be configured to determine the transmission size indicator 320, based on whether an end marker 550 is received within a threshold time, $T_{TH}$, in accordance with the embodiment shown in FIGS. 5A and 5B as previously described.

Alternatively, even if the base station 308 does receive size information for the portion of data 311, the base station 308 may be configured to perform a confirmation of the transmission size indicator 320, based on whether an end marker 550 is received within a threshold time, $T_{TH}$, in accordance with the embodiment shown in FIGS. 5A and 5B as previously described.

If received size information 610 is provided to the base station 308, the base station 308 may determine whether the portion of data 311 is a small data payload by comparing the received size information 610 for the portion of data 311 to a data size threshold $S_{TH}$. The received size information 610 for the portion of data 311 may indicate the size of the portion of data 311 as a number of packets, where each packet may have a predetermined size, as a total number of bits (more preferably Kbits), and/or as a number of packets and their corresponding size as a number of bits.

The received size information 610 for the portion of data 311 may be contained within the first data packet of the plurality of data packets of the portion of data 311. Alternatively, the received size information 610 for the portion of data 311 may be contained within a first set of data packets of the plurality of data packets of the portion of data 311.

The received size information 610 may be contained within a header of the first data packet 510 or collectively contained within the headers of the first set of data packets. More specifically, a GTP-U header for the first data packet or the GTP-U headers for the first set of data packets may be enhanced to contain the size information 610 for the portion of data 311. The size information 610 for the portion of data 311 may be included in the GTP-U headed using reserved bits inside the message type field or other fields of the header.

If the received size information 610 for the portion of data 311 indicates that the portion of data 311 is less than or equal to a data size threshold $S_{TH}$, then the portion of data 311 is determined to be a small data payload. The portion of data 311 being a small data payload means that it is sized such that small data transmission (SDT) can be used by the terminal 310 to receive the portion of data 311 from the base station 208, thereby allowing transmission of the portion of data 311 from the base station 308 to the terminal while the terminal 310 is in the terminal inactive mode.

Alternatively, if the received size information 610 for the portion of data 311 indicates that the portion of data 311 is greater than the data size threshold $S_{TH}$, then the portion of data 311 is determined to not to be a small data payload. As such, such that the portion of data 311 is regular or normal data payload, because all data packets of the plurality of data packets, which form the portion of data 311, have a total size that is greater than the data size threshold $S_{TH}$, where the data size threshold $S_{TH}$ defines the upper limit of the size of data that can be send as a small data transmission (SDT). The portion of data 311 being regular or normal data payload means that it is sized such that small data transmission (SDT) cannot be used by the terminal 310 to receive the portion of data 311 from the base station 208. Therefore, the transmission of the portion of data 311 from the base station 308 to the terminal 310 may not occur while the terminal 310 is in the terminal inactive mode. Instead, the transmission of the portion of data 311 from the base station 308 to the terminal 310 has to occur while the terminal 310 is in the terminal connected mode.

The base station 308 determines the transmission size indicator 320 for the portion of data 311 based on the determination of whether the portion of data 311 is a small data payload.

If the base station 308 determined that the portion of data is a small data payload because the received size information 610 for the portion of data 311 indicates that the portion of data 311 is less than or equal to a data size threshold $S_{TH}$, then base station determines that the transmission size indicator 320 is a small data payload indicator. That is, the transmission size indicator 320 is configured such that the transmission size indicator 320 being a small data payload indicator allows the terminal 310 to determine that the portion of data 311 is a small data payload.

Alternatively, if the base station 308 that the portion of data 311 is not a small data payload, and instead is regular or normal data payload, because all data packets of the plurality of data packets, which form the portion of data 311, have a total size that is greater than the data size threshold $S_{TH}$, then the base station determines that the transmission size indicator 320 is a regular or normal data payload indicator. That is, the transmission size indicator 320 is configured such that the transmission size indicator 320 being a regular or normal data payload indicator allows the terminal 310 to determine that the portion of data 311 is regular or normal data payload.

Once the base station 308 has determined the transmission size indicator 320, it may be provided 316 to the terminal 320. Alternatively, in the embodiment shown in FIG. 7, the base station may also require a confirmation of the transmission size indicator 320. The confirmation of the transmission size indicator 320, i.e. confirming that the transmissions size indicator 320 determine based on the data size threshold $S_{TH}$ is correct, may be performed by the base station 308 also determining the transmission size indicator 320 based on whether an end marker 550 is received within a threshold time, $T_{TH}$, in accordance with the embodiment shown in FIGS. 5A and 5B. The confirmation may also comprise confirming that both determined transmission size indicators are small data payload indicators or that both transmission size indicators are regular or normal data payload indicators. If both determined transmission size indicators are small data payload indicators or both transmission size indicators are regular or normal data payload indicators then the base station 308 may confirm that the transmission size indicator is correct. If both determined transmission size indicators are not small data payload indicators or both transmission size indicators are not regular or normal data payload indicators, e.g. one of the determined transmission size indicators is a small data payload indicator and one of the determined transmission size indicators is a normal or regular data indicator then the transmission size indicator may not be confirmed and, instead, may be indicated as inconsistent or incorrect.

If the base station 308 confirms the transmission size indicator 320 is correct the base station 308 may provide the transmission size indicator 320 to the terminal 320. The base station 308 is configured to provide the transmission size indicator 320 to the terminal using an enhanced paging message 316. The enhanced paging message 316 is a paging message 216, as described in accordance with FIG. 2 above, which further includes the transmission size indicator 320.

The transmission size indicator 320 may be a cause value, in accordance with the embodiment of FIG. 3 described above.

The terminal 310 may be in the terminal inactive state when the enhanced paging message 316 is provided to the terminal 310 by the base station 308. The terminal 310 may remain in the terminal inactive state when receiving the enhanced paging message 316 from the base station 308.

If the base station 308 determined that the portion of data is a small data payload, the enhanced paging message 316 provided by the base station 308 to the terminal 310 is a paging message that further includes the determined size indicator 320, which is a small data payload indicator. As such, the base station 308 provides an enhanced paging message 316 including a small data payload indicator to the terminal 310.

Alternatively, if the base station 308 determines that the portion of data is a small data payload and, instead, is regular or normal data payload, the enhanced paging message 316 provided by the base station 308 to the terminal 310 is a paging message that further includes the determined size indicator 320, which is a normal or regular data indicator. As such, the base station 308 provides an enhanced paging message 316 including a normal or regular data indicator to the terminal 310.

If the portion of data 311 is a small data payload, the enhanced paging message 316 is configured to allow the terminal 310 to determine a required terminal connection state, for receiving the portion of data 311, based on the transmission size indicator 320 being a small data payload indicator. The terminal 310 may, therefore, determine that the required terminal connection state, for receiving the portion of data 311, is the terminal inactive state based on the transmission size indicator 320 being a small data payload indicator.

Alternatively, if the portion of data is not a small data payload and, instead, is regular or normal data payload, the enhanced paging message 316 is configured to allow the terminal 310 to determine a required terminal connection state, for receiving the portion of data 311, based on the transmission size indicator 320 being a regular or normal data payload indicator. The terminal 310 may, therefore, determine that the required terminal connection state, for receiving the portion of data 311, is the terminal connected state based on the transmission size indicator 320 being a normal or regular data indicator.

The base station 308 may then transmit 318 the portion of data 311 to the terminal 310. The transmission 318 of the portion of data 311 may be a small data transmission (SDT) if the portion of data 311 is a small data payload. The transmission 318 may provide the portion of data 311 to the terminal 310 as a small data transmission (SDT). Alternatively, if the portion of data is not a small data payload and, instead, is regular or normal data payload, the transmission 318 of the portion of data 311 may be a regular or normal data payload transmission which is transmitted in accordance with the one or more standards protocols under which the base station 308 is operating. The transmission 318 may provide the portion of data 311 to the terminal 310, as a regular or normal data payload transmission which is transmitted in accordance with the one or more standards protocols under which the base station 308 is operating.

If the base station 308 does not confirm that the transmission size indicator 320 is correct and, instead, it is indicated that the transmission size indicator 320 is inconsistent or incorrect, then the base station 308 may not provide the transmission size indicator 320 to the terminal 310 and may, instead, perform a number of alternative actions. For example, the base station 308, may provide an error message or query to the UPF or server relating to the received size information 610 or the placement of the end marker 550. The base station 308 may also default to providing a transmission size indicator 320 that is a normal or regular data indicator if it is indicated that the transmission size indicator is inconsistent or incorrect. This may ensure that the terminal 310 is able to receive the transmission 318 of the portion of data 311 from the base station 308 irrespective of the size of, or amount of data in, the portion of data 311.

If the base station 308 does not receive size information for the portion of data 311 the base station 308 may be configured to determine the transmission size indicator 320, based on whether an end marker 550 is received within a threshold time, $T_{TH}$, alone. The base station may subsequently provide the determined transmission size indicator 320, and the portion of data 311, to the terminal in accordance with the embodiment shown in FIGS. 5A and 5B as previously described.

In some embodiments of the invention, in accordance with any of the embodiments described in FIGS. 3 to 7 above, the terminal 310 may continue to receive data in the terminal inactive state after receipt of the portion of data 311. The terminal 310 may receive an additional, second portion of data (not shown), where the second portion of data is also small data, whilst in the terminal inactive state using Small Data Transmission (SDT). The terminal may further receive additional, third, fourth, fifth, etc., portions of data from the base station 308 whilst in the terminal inactive state, where the third, fourth, fifth, etc., portions of data are small data.

In some embodiments, the base station 308 may transmit a further enhanced paging message for each additional portion of data to be transmitted to the terminal 310. Each of the further enhanced paging messages having been generated in accordance with any of the embodiments described in FIGS. 3 to 7 above. Upon receiving each of the further enhanced paging messages from the base station 308 the terminal 310 may determine the required terminal connection state for the respective portion of additional data. Where the portions of additional data are small data the terminal may then determine, based on the further enhanced paging messages, that the required terminal connection state for receiving a respective portion of data is the terminal inactive state, such that the terminal 310 may remain in the terminal inactive state to receive said additional portion of data.

Alternatively, in some embodiments the terminal 310 may remain in the terminal inactive state until instructed otherwise by the base station 308. The base station 308 may not send further enhanced paging messages for each of the additional portions of data. Instead, where the additional portions of data are small data, the base station 308 may transmit the additional portions of data to the terminal using Small Data Transmission (SDT) whilst the terminal 310 remains in the terminal inactive state. The base station 308 may then send an additional enhanced paging message to the terminal 310 if the base station determines that an additional portion of data to be transmitted to the terminal 310 is not small data. The additional enhanced paging message may include a transmission size indicator which is a normal or regular data payload indicator, such that the terminal 310 may determine that the required terminal connection state for receiving the respective additional portion of data is the terminal connected state. For example, the base station may send the portion of data 311, as well as second and third portions of data to the terminal 310 while the terminal 310 is in the terminal inactive state as Small Data Transmission (SDT), but may determine that a fourth portion of data to be transmitted to the terminal 310 is not small data and may transmit information to the terminal 310, which may be in the form of a further enhanced paging message, to transition the terminal 310 to the terminal connected state.

The base station 308 may instruct the terminal 310, to move to the terminal connected state, or terminal idle state, after the transmission of the portion of data, and optionally one or more additional portions of data.

The base station 308 may also transmit further information to the terminal 310 to instruct or cause the terminal 310 to move to the terminal connected state after the enhanced paging message 316 has been received by the terminal 310 but before the transmission of the portion of data 311 to the terminal, even where the enhanced paging message 316 comprised a transmission size indicator 320 that was a small data payload indicator. The base station 308 may, therefore, cause the terminal 310 to move to the terminal connected state even when the portion of data is small data. As such, the terminal 310 may receive the portion of data 311 in the terminal connected state even when the portion of data is small data. This base station 308 may transmit the further information to the terminal 310, to move the terminal to the terminal connected state, for a number of different reasons, for example, the base station 308 may have received a further portion of data for transmission to the terminal 310 which is not small data, such as an incoming phone call.

Additionally or alternatively, in some embodiments the base station 308 may transmit further information, such as a command, interrupt, paging message, or enhanced paging message, to the terminal at a time during or after the process described in any one of FIGS. 3 to 7, which may cause the terminal 310 to transition to the terminal connected state.

Figure 8:
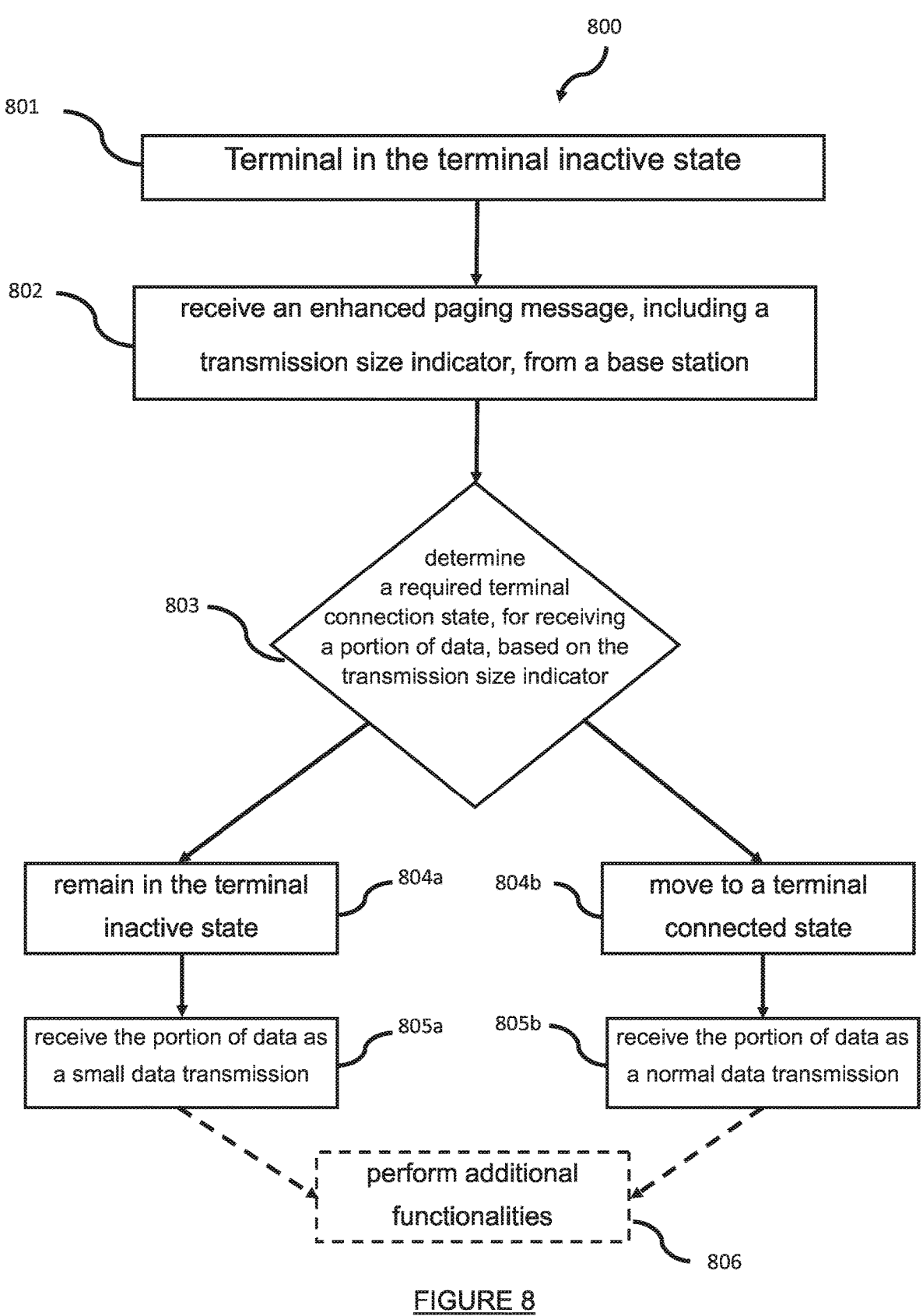
FIG. 8 depicts a method carried out by a terminal of a mobile communication network according to an embodiment of the invention.

FIG. 8 depicts a flow chart of a method 800 which may be carried out by a terminal 310 of the mobile telecommunications network 300 in accordance with any of the embodiments depicted in FIGS. 3 to 7 as described above.

Initially at step 801 the terminal 310 is in the terminal inactive state, e.g. RRC_INACTIVE. The terminal 310 may previously have been in the terminal active state, e.g. RRC_CONNECTED, but transitioned to the terminal inactive state when a significant number of network resources were no longer required and active and/or ongoing communication, such as the regular transmission of data, was no longer occurring between the terminal 310 and the base station 308.

At step 802, the terminal 310 receives an enhanced paging message 316 from the base station 308.

The enhanced paging message 316 is a paging message 216, as described in accordance with FIG. 2 above, which further includes the transmission size indicator 320. The enhanced paging message 316 is configured to allow the terminal 310 to determine a required terminal connection state, for receiving the portion of data 311, based on the transmission size indicator 320.

The transmission size indicator 320 may be a cause value.

At step 803, the terminal 310 determines required terminal connection state, for receiving the portion of data 311, based on the transmission size indicator 320.

The terminal 310 may have been configured to determine a required terminal connection state, for receiving the portion of data 311, based on the transmission size indicator 320, upon its initial connection with the base station 308.

Alternatively, the terminal 310 may have been configured to determine a required terminal connection state, for receiving the portion of data 311, based on the transmission size indicator 320, as part of the terminals manufacture or via one or more previously installed or downloaded computer programs (or software or instructions or code).

If the transmission size indicator 320 indicates that that the portion of data 311 is sized such that small data transmission (SDT) can be used by the terminal 310 to receive the portion of data 311 from the base station 308, then the terminal 310 remains in the terminal inactive state to receive the portion of data 311. That is, the transmission size indicator 320 allows the terminal 310 to determine that the required terminal transmission state for receiving the portion of data 311 from the base station 308 is the terminal inactive state.

In this scenario, at step 804a the terminal 310 remains in the terminal inactive state.

In this scenario, at step 805a, the terminal 310 receives the portion of data 311 as a Small Data Transmission (SDT).

Alternatively, if the transmission size indicator 320 indicates that the portion of data 311 is sized such that small data transmission (SDT) cannot be used by the terminal 310 to receive the portion of data 311 from the base station 208, then the terminal 310 cannot remain in the terminal inactive state to receive the portion of data 311. That is, the transmission indicator 320 may allow the terminal 310 to determine that the required terminal transmission state for receiving the portion of data 311 from the base station 308 is the terminal connected state.

In this scenario, at step 804b the terminal 310 moves to the terminal connected state.

In this scenario, at step 805b, the terminal 310 receives the portion of data 311 as a normal or regular data transmission in accordance with the one or more standards protocols under which the terminal 310 is operating.

Optionally, at step 806, after receiving the portion of data 311, the terminal 310 may perform any number of additional functionalities based on the received portion of data 311 or the configuration of the terminal 310.

In some embodiments, the terminal 310 may process the portion of data 311 and perform one or more actions based on a contents of the portion of data 311. The contents of the portion of data 311 may comprise one or more instructions for the terminal 310. The terminal 310 may move from the current terminal connected state to a different terminal connected state based on the contents of the portion of data 311. For example, the terminal 310, may move from the terminal inactive state to the terminal idle state. The terminal 310 may switch off or power down based on the contents of the portion of data 311. The terminal 310 may alter its behaviour in a manner defined by the contents of the portion of data 311, such as performing one or more additional functionalities of the terminal 310, stopping one or more currently active functionalities of the terminal 310, changing a frequency or periodicity with which one or more functionalities of the terminal 310 are performed, or any combination thereof.

For example, if the terminal is a wireless sensor for monitoring one or more of a pressure, temperature, humidity, or other physical or environmental condition which may form part of a Wireless Sensor Network (WSN), then the portion of data 311 may comprise one or more instructions for the wireless sensor or sensor(s). The instructions may cause the sensor to change the frequency/rate at which it is providing data to the base station. The instructions may cause the sensor switch off or power down, this may allow a malfunctioning or faulty sensor to be easily and efficiently removed from the WSN without unnecessarily reallocating resources.

Further, in some embodiments, the terminal 310 may receive an additional, second portion of data (not shown), where the second portion of data is also small data, whilst in the terminal inactive state using Small Data Transmission (SDT). The terminal may further receive additional, third, fourth, fifth, etc., portions of data from the base station 308 whilst in the terminal inactive state, where the third, fourth, fifth, etc., portions of data are small data.

In some embodiments, the terminal 310 may receive a further enhanced paging message for each additional portion of data. Each of the further enhanced paging messages having been generated by the base station 308 in accordance with any of the embodiments described in FIGS. 3 to 7 above. Upon receiving each of the further enhanced paging messages the terminal 310 may determine the required terminal connection state for the respective portion of additional data. Where the portions of additional data are small data the terminal 310 may then determine, based on the further enhanced paging messages, that the required terminal connection state for receiving a respective portion of data is the terminal inactive state, such that the terminal 310 may remain in the terminal inactive state to receive said additional portion of data.

Alternatively, in some embodiments the terminal 310 may remain in the terminal inactive state until instructed otherwise by the base station 308. The terminal 310 may not receive further enhanced paging messages for each of the additional portions of data. Instead, where the additional portions of data are small data, the terminal 310 may receive the additional portions of data to the terminal using Small Data Transmission (SDT) whilst the terminal 310 remains in the terminal inactive state. The terminal 310 may receive an additional enhanced paging message if an additional portion of data to be received by the terminal 310 is not small data. The additional enhanced paging message may include a transmission size indicator which is a normal or regular data payload indicator, such that the terminal 310 may determine that the required terminal connection state for receiving the respective additional portion of data is the terminal connected state.

The terminal 310 may receive further information which causes the terminal 310 to move to the terminal connected state after the enhanced paging message 316 has been received by the terminal 310 but before the transmission of the portion of data 311 to the terminal, even where the enhanced paging message 316 comprised a transmission size indicator 320 that was a small data payload indicator. The terminal 310 may, therefore, move to the terminal connected state even when the portion of data is small data. As such, the terminal 310 may receive the portion of data 311 in the terminal connected state even when the portion of data is small data.

Additionally or alternatively, in some embodiments the terminal 310 may receive further information, such as a command, interrupt, paging message, or enhanced paging message, at any time during or after the method of FIG. 8, which may cause the terminal 310 to transition to the terminal connected state.

The above described embodiments of the invention allow for a more flexible and efficient telecommunication network. In particular, because the terminal 310 is able to receive a portion of data 311 as a Small Data Transmission (SDT), such that the terminal is able to remain in the terminal inactive state, when the portion of data 311 is a small data payload, the terminal 310 does not need to always resume the previously established connection with the base station 308. This allows the resources of the telecommunications network to be allocated more efficiently, as resources are not being unnecessarily co-opted to transmit a small data payload, whilst retaining flexibility, because the resources can be allocated to establishing the communication channel between the terminal 310 and the base station when required.

The above described embodiments also improve the battery life of the terminal by avoiding resuming or establishing connections, which may involve resource reallocation and control signalling, to the base station which is unnecessary for transmission of a small data payload.

Although specific embodiments have now been described, the skilled person will understand that various modifications and variations are possible. Also, combinations of any specific features shown with reference to one embodiment or with reference to multiple embodiments are also provided, even if that combination has not been explicitly detailed herein.

The invention claimed is:

1. A method of facilitating data transmissions in a mobile telecommunications network, comprising:
   receiving, at a base station of the mobile telecommunications network, a portion of data to be transmitted to a terminal connected to the mobile telecommunications network;
   determining a transmission size indicator for the portion of data; and
   providing an enhanced paging message to the terminal, the enhanced paging message including the transmission size indicator;
   wherein the enhanced paging message is configured to allow the terminal to determine a required terminal connection state, for receiving the portion of data, based on the transmission size indicator,
   wherein determining the transmission size indicator for the portion of data comprises: determining if the portion of data to be transmitted to the terminal is a small data payload, and
   wherein determining if the portion of data to be transmitted to the terminal is a small data payload comprises: determining if the portion of data was received by the base station within a threshold time.

2. The method of claim 1, wherein the transmission size indicator is either a small data payload indicator or a normal data payload indicator.

3. The method of claim 1, wherein:
   (i) if the portion of data was received by the base station within a threshold time then the portion of data to be transmitted to the terminal is a small data payload; or
   (ii) if the portion of data was not received by the base station within a threshold time then the portion of data to be transmitted to the terminal is a normal data payload.

4. The method of claim 1, wherein the portion of data comprises a plurality of data packets and a final data packet of the plurality of data packets comprises an end marker.

5. The method of claim 4, wherein determining if the portion of data was received by the base station within a threshold time comprises: determining whether the end marker was received before a cut-off time.

6. The method of claim 1, the method further comprising: receiving, at the base station, size information for the portion of data.

7. The method of claim 6, wherein determining if the portion of data is a small data payload comprises: comparing the received size information for the portion of data to a threshold data transmission size.

8. The method of claim 7, wherein:
   (i) if the received size information for the portion indicates that a size of the portion of data received by the base station is less than or equal to a threshold data transmission size then the portion of data to be transmitted to the terminal is a small data payload; or
   (ii) if the received size information for the portion indicates that a size of the portion of data received by the base station exceeds a threshold data transmission size then the portion of data to be transmitted to the terminal is a normal data payload.

9. The method of claim 6, wherein a first data packet, or a first set of data packets, of the portion of data comprises the size information for the portion of data.

10. The method of claim 9, wherein the size information for the portion of data is provided in a header of the first data packet or headers of the first set of data packets.

11. An apparatus comprising:

one or more processors; and a non-transitory computer storage device having stored thereon computer executable instructions which, when executed by the one or more processors, causes the apparatus to perform the following:

receive, at a base station of a mobile telecommunications network, a portion of data to be transmitted to a terminal connected to the mobile telecommunications network;

determine a transmission size indicator for the portion of data; and provide an enhanced paging message to the terminal, the enhanced paging message including the transmission size indicator;

wherein the enhanced paging message is configured to allow the terminal to determine a required terminal connection state, for receiving the portion of data, based on the transmission size indicator, wherein determining the transmission size indicator for the portion of data comprises: determining if the portion of data to be transmitted to the terminal is a small data payload, and wherein determining if the portion of data to be transmitted to the terminal is a small data payload comprises: determining if the portion of data was received by the base station within a threshold time.

12. A non-transitory computer storage device having stored thereon computer executable instructions which, when executed by one or more processors, causes the one or more processors to perform the following:

receive, at a base station of a mobile telecommunications network, a portion of data to be transmitted to a terminal connected to the mobile telecommunications network;

determine a transmission size indicator for the portion of data; and provide an enhanced paging message to the terminal, the enhanced paging message including the transmission size indicator;

wherein the enhanced paging message is configured to allow the terminal to determine a required terminal connection state, for receiving the portion of data, based on the transmission size indicator, wherein determining the transmission size indicator for the portion of data comprises: determining if the portion of data to be transmitted to the terminal is a small data payload, and wherein determining if the portion of data to be transmitted to the terminal is a small data payload comprises: determining if the portion of data was received by the base station within a threshold time.

* * * * *